US012806616B2

(12) United States Patent
June et al.

(10) Patent No.: US 12,806,616 B2
(45) Date of Patent: Nov. 24, 2026

(54) MICROCHANNEL SEGMENTATION SYSTEM FOR PRECISE FLUID STORAGE, HANDLING ANDDELIVERY

(71) Applicant: Signature Science, LLC, Austin, TX (US)

(72) Inventors: Viviana June, Round Rock, TX (US); Ross J. Fiedler, Austin, TX (US); John Kirby Kendall, Battle Ground, WA (US)

(73) Assignee: Signature Science, LLC, Austin, TX (US)

( * ) Notice: Subject to any disclaimer, the term of this patent is extended or adjusted under 35 U.S.C. 154(b) by 0 days.

(21) Appl. No.: 19/090,377

(22) Filed: Mar. 25, 2025

(65) Prior Publication Data

US 2025/0296081 A1 Sep. 25, 2025

Related U.S. Application Data

(60) Provisional application No. 63/569,705, filed on Mar. 25, 2024.

(51) Int. Cl.
*B01L 3/00* (2006.01)

(52) U.S. Cl.
CPC ..... *B01L 3/5027* (2013.01); *B01L 2200/0673* (2013.01); *B01L 2200/16* (2013.01); *B01L 2300/0663* (2013.01); *B01L 2300/18* (2013.01); *B01L 2400/0478* (2013.01); *B01L 2400/0481* (2013.01)

(58) Field of Classification Search
None
See application file for complete search history.

(56) References Cited

U.S. PATENT DOCUMENTS

| | | | | |
|---|---|---|---|---|
| 7,318,912 | B2 | 1/2008 | Pezzuto et al. | |
| 10,107,728 | B2 | 10/2018 | Mostowfi et al. | |
| 10,875,017 | B2 | 12/2020 | Solomon et al. | |
| 2007/0068573 | A1 | 3/2007 | Cox et al. | |
| 2020/0316605 | A1 * | 10/2020 | Wang ................. | G01N 21/6428 |
| 2022/0080424 | A1 * | 3/2022 | Akhremichev ..... | B01F 25/4317 |

(Continued)

FOREIGN PATENT DOCUMENTS

WO WO 02/100543 A1 12/2002

OTHER PUBLICATIONS

Yao, C.; Zhao, Y.; Ma, H.; Liu, Y.; Zhao, Q.; Chen, G., "Two-phase flow and mass transfer in microchannels: A review from local mechanism to global models," Chemical Engineering Science 229, 116017 (2021), available online Aug. 9, 2020, doi:10.1016/j.ces.2020.116017.

(Continued)

*Primary Examiner* — Lore R Jarrett
(74) *Attorney, Agent, or Firm* — John A. Fortkort; Fortkort & Houston PC

(57) ABSTRACT

A method is provided for preventing mixing between adjacent slugs within a microchannel fluid storage and delivery system. The method includes the steps of introducing a sequence of discrete slugs into a microchannel, wherein said sequence includes at least one aqueous slug and at least one hydrophobic slug which are adjacent to each other; and disposing an air slug between said adjacent aqueous and hydrophobic slugs.

20 Claims, 15 Drawing Sheets

(56) References Cited

U.S. PATENT DOCUMENTS

2024/0001365 A1* 1/2024 Ahitan ............... G01N 33/2823

OTHER PUBLICATIONS

Bakhtiari, A.; Kaehler, C.J., "A method to prevent clogging and clustering in microfluidic systems using microbubble streaming," Biomicrofluidics 18, 044101 (2024), published Jul. 2, 2024, doi:10.1063/5.0214436.

Liou, D.-S.; Kuo, L.-S.; Chen, P.-H.; Chang, T.-L.; Yang, C.-T., "Axial particle displacements in fluid slugs after passing a simple serpentiform microchannel," Microfluidics and Nanofluidics 7:145-148 (2009), doi:10.1007/s10404-008-0373-6.

Arias, S., "Comparison of Two Gas Injection Methods for Generating Bubbles in a T-junction," Microgravity Science and Technology 32:703-713 (2020), published May 28, 2020, doi:10.1007/s12217-020-09790-3.

Li, Y.; Reddy, R.K.; Kumar, C.S.S.R.; Nandakumar, K., "Computational investigations of the mixing performance inside liquid slugs generated by a microfluidic T-junction," Biomicrofluidics 8, 054125 (2014), doi:10.1063/1.4900939.

Asano, S.; Takahashi, Y.; Maki, T.; Muranaka, Y.; Cherkasov, N.; Mae, K., "Contactless mass transfer for intra-droplet extraction," Scientific Reports 10, 7685 (2020), doi:10.1038/s41598-020-64520-4.

Nan, L.; Zhang, H.; Weitz, D.A.; Shum, H.C, "Development and future of droplet microfluidics," Lab on a Chip 24:1135-1153 (2024), published Jan. 2, 2024, doi:10.1039/D3LC00729D.

Zhang, T.; Shao, T.; Zhang, Y.; Pan, D.; Huang, W.; Li, B., "Effect of interface deformation on hydrodynamics of liquid-liquid two-phase flow in a confined microchannel," Chemical Engineering Journal 427, 131956 (2022), doi:10.1016/j.cej.2021.131956.

Wang, X.; Pang, Y.; Ma, Y.; Ren, Y.; Liu, Z., "Flow regimes of the immiscible liquids within a rectangular microchannel," Acta Mechanica Sinica 37(10):1544-1556 (2021), published Aug. 31, 2021, doi:10.1007/s10409-021-01128-5.

Yao, C.; Liu, Y.; Xu, C.; Zhao, S.; Chen, G., "Formation of Liquid-Liquid Slug Flow in a Microfluidic T-Junction: Effects of Fluid Properties and Leakage Flow," AlChE Journal 64(1):346-357 (2018), doi:10.1002/aic15889.

Holtze, C., "Large-scale droplet production in microfluidic devices—an industrial perspective," Journal of Physics D: Applied Physics 46, 114008 (2013), published Feb. 22, 2013, doi:10.1088/0022-3727/46/11/114008.

Yao, C.; Dong, Z.; Zhang, Y.; Mi, Y.; Zhao, Y.; Chen, G., "On the Leakage Flow around Gas Bubbles in Slug Flow in a Microchannel," AlChE Journal 61:3964-3972 (2015), published Jun. 11, 2015, doi:10.1002/aic.14895.

Duraiswamy, S.; Khan, S.A., "Plasmonic Nanoshell Synthesis in Microfluidic Composite Foams," Nano Letters 10:3757-3763 (2010), published Aug. 23, 2010, doi:10.1021/nl102478q.

Ladosz, A.; Rigger, E.; Von Rohr, P.R., "Pressure drop of three-phase liquid-liquid-gas slug flow in round microchannels," Microfluidics and Nanofluidics 20, 49 (2016), published Feb. 29, 2016, doi:10.1007/s10404-016-1712-7.

Santana, H.S.; Silva, J.L., Jr.; Aghel, B.; Ortega-Casanova, J., "Review on microfluidic device applications for fluids separation and water treatment processes," SN Applied Sciences 2, 395 (2020), published Feb. 12, 2020, doi:10.1007/s42452-020-2176-7.

Khan, W.; Chandra, A.K.; Kishor, K.; Sachan, S.; Alam, M.S., "Slug formation mechanism for air-water system in T-junction microchannel: a numerical investigation," Chemical Papers (2018), doi:10.1007/s11696-018-0522-7.

Yao, C.; Dong, Z.; Zhao, Y.; Chen, G., "The Effect of System Pressure on Gas-Liquid Slug Flow in a Microchannel," AlChE Journal 60(3):1132-1142 (2014), published online Dec 11, 2013, doi:10.1002/aic14306.

Scheiff, F.; Mendorf, M.; Agar, D.; Reis, N.; Mackley, M., "The separation of immiscible liquid slugs within plastic microchannels using a metallic hydrophilic sidestream," Lab on a Chip 11:1022-1029 (2011), published Jan. 28, 2011, doi:10.1039/COLC00442A.

Bai, F.; He, X.; Yang, X.; Zhou, R.; Wang, C., "Three dimensional phase-field investigation of droplet formation in microfluidic flow focusing devices with experimental validation," International Journal of Multiphase Flow 93:130-141 (2017), doi:10.1016/j.ijmultiphaseflow.2017.04.008.

Virappane, S.; Azadi, R.; Mukherjee, N.; Tsai, P.A., "Three-dimensional simulations of two-phase plug flow in a microfluidic channel," Physics of Fluids 36, 102019 (2024), published Oct. 10, 2024, doi:10.1063/5.0220101.

Cech, J.; Pribyl, M.; Snita, D., "Three-phase slug flow in microchips can provide beneficial reaction conditions for enzyme liquid-liquid reactions," Biomicrofluidics 7, 054103 (2013), published Sep. 10, 2013, doi:10.1063/1.4821168.

Du, W.; Duan, Y.; Wang, L.; Liu, D., "Liquid-Liquid Two-Phase Flow and Size Prediction of Slug Droplets in Microchannels," Processes 11, 2390 (2023), published Aug. 8, 2023, doi:10.3390/pr11082390.

Rahman, M.T.; Fukuyama, T.; Kamata, N.; Sato, M.; Ryu, I., "Low pressure Pd-catalyzed carbonylation in an ionic liquid using a multiphase microflow system," Chemical Communications, 2236-2238 (2006), published Apr. 28, 2006, doi:10.1039/B600970K.

Liu, K.; Chen, Y.-C.; Tseng, H.-R.; Shen, CK.-F.; Van Dam, R.M., "Microfluidic device for robust generation of two-component liquid-in-air slugs with individually controlled composition," Microfluidics and Nanofluidics 9:933-943 (2010), doi:10.1007/s10404-010-0617-0.

Khan, S.A.; Duraiswamy, S., "Microfluidic emulsions with dynamic compound drops," Lab on a Chip 9:1840-1842 (2009), published May 22, 2009, doi:10.1039/B904119B.

Maghazeh, M.; Pishbin, H.; Navidbakhsh, M.; Pishbin, E., "Numerical investigation of centrifuge-trapping technique for generating gas-liquid flows in microchannels, " Physics of Fluids 34, 082001 (2022), published Aug. 1, 2022, doi:10.1063/5.0095472.

Chandra, A.K.; Kishor, K.; Mishra, P.K.; Alam, M.S., "Numerical Investigations of Two-phase Flows through Enhanced Microchannels," Chemical and Biochemical Engineering Quarterly 30(2):149-159 (2016), doi:10.15255/CABEQ.2015.2289.

Mbanjwa, M.B.; Harding, K.; Gledhill, I.M.A., "Numerical Modelling of Mixing in a Microfluidic Droplet Using a Two-Phase Moving Frame of Reference Approach," Micromachines 13, 708 (2022), published Apr. 30, 2022, doi:10.3390/mi13050708.

Wielhorski, Y.; Ben Abdelwahed, A.; Arquis, E.; Glockner, S.; Breard, J., "Numerical Simulation of Bubble Formation and Transport in Cross-Flowing Streams," Journal of Computational Multiphase Flows 6(3):299-312 (2014), doi:10.1260/1757-482X.6.3.299.

Qin, N.; Feng, Y.; Wen, J.Z.; Ren, CL., "Numerical Study on Single Flowing Liquid and Supercritical CO2 Drop in Microchannel: Thin Film, Flow Fields, and Interfacial Profile," Inventions 3, 35 (2018), published Jun. 1, 2018, doi:10.3390/inventions3020035.

* cited by examiner

MICROCHANNEL SEGMENTATION SYSTEM FOR PRECISE FLUID STORAGE, HANDLING ANDDELIVERY

CROSS-REFERENCE TO RELATED APPLICATIONS

This application claims the benefit of U.S. provisional application No. 63/777,567 filed Mar. 25, 2025, having the same title and the same inventor, and which is incorporated herein by reference in its entirety. This application also claims the benefit of U.S. provisional application No. 63/569,705 filed Mar. 25, 2024, having the same title and the same inventor, and which is incorporated herein by reference in its entirety.

FIELD OF THE DISCLOSURE

The present disclosure relates generally to systems and methods for the storage and delivery of discrete volumes of liquids, and more specifically systems and methods for the storage and delivery of discrete volumes of liquids in microfluidics and biochemical processing.

BACKGROUND OF THE DISCLOSURE

In many chemical or biological processing flows, a number of discrete aliquots of reagents must be added to one or more vessels for steps such as heating, mixing, cooling, wait times, or the like. For example, in some existing systems for preparing a DNA sample for PCR processing, a technician or a robot is required to use a micropipette to add aliquots of reagents to a sample vessel.

If conventional microfluidics technologies are utilized to automate this process, each reagent must typically be stored in a sealed reservoir or loaded to an addition well. Each addition of the reagent requires operating a valve. In microfluidics, these valves are often bulky and typically operate based on the specific properties of each fluid (for example, surface tension) so that aliquots can be created by the fluidic flow. However, these valves are typically not fluid agnostic and must be designed specifically for each reagent. These drawbacks limit the flexibility of these systems and increase their complexity. Systems that use air as a separator between fluid slugs are typically not robust against physical jarring or vibration, leading to the potential for slug fragmentation or mixing.

Conventional microfluidics technologies also struggle to store, transport and deliver discrete fluid aliquots without risking evaporation or undesired mixing, This drawback may compromise the integrity of samples and reagents.

Asano et al., "Contactless mass transfer for intra-droplet extraction", investigated the potential of transferring substances between water droplets (slugs) separated by oil in microfluidic channels without direct contact. Using a system of solenoid valves and an optical sensor to form and sort these slugs, they demonstrated the efficient transfer of bromothymol blue (BTB) from acidic to basic aqueous slugs. They identified the high efficiency of slug flow for mass transfer, the importance of channel design and slug composition in optimizing transfer, and the identification of a "rear-to-rear" transfer mechanism facilitated by secondary vortices.

SUMMARY OF THE DISCLOSURE

In one aspect, a method is provided for preventing mixing between adjacent slugs within a microchannel fluid storage and delivery system. The method comprises introducing a sequence of discrete slugs into a microchannel, wherein said sequence includes at least one aqueous slug and at least one hydrophobic slug which are adjacent to each other; and disposing an air slug between said adjacent aqueous and hydrophobic slugs.

In another aspect, a microchannel fluid storage and delivery apparatus is provided which comprises a microchannel for housing a sequence of discrete slugs, including at least one aqueous slug and at least one hydrophobic slug adjacent to each other; and a mechanism for introducing an air slug between said adjacent aqueous and hydrophobic slugs to prevent direct water/oil interfaces.

In a further aspect, a method for preventing mixing between adjacent slugs within a microchannel fluid storage and delivery system is provided. The method comprises introducing a sequence of discrete slugs into a microchannel, wherein said sequence includes at least one aqueous slug and at least one hydrophobic slug which are adjacent to each other; and solidifying the at least one oil slug.

In still another aspect, a microfluidic apparatus for the controlled prevention of mixing between adjacent fluidic slugs is provided. The device comprises a microchannel designed to receive and house a sequence of discrete fluid slugs, including at least one aqueous slug and at least one oil slug positioned to be adjacent to each other within the sequence; and an integrated system for selectively solidifying at least one of the oil slugs situated between the aqueous slugs, thereby acting as a solid barrier to prevent mixing.

In yet another aspect, a fluid storage and delivery system is provided which comprises a microchannel structure configured to accommodate discrete fluid slugs; and partitions within said microchannel structure, wherein said partitions include at least one material selected from the group consisting of liquids, gases, and solidifiable oils to separate the discrete fluid slugs; wherein said partitions are adjustable or removable to facilitate controlled recombination of the fluid slugs; wherein said system is characterized by the absence of mechanical or fluidic valves for the manipulation of fluid flow within the microchannel structure.

In a further aspect, a method is provided for preventing mixing between adjacent slugs within a microchannel fluid storage and delivery system. The method comprises introducing a sequence of discrete slugs into a microchannel, wherein sequence includes at least one aqueous slug and at least one oil slug which are adjacent to each other, wherein said slugs are selected from the group consisting of aqueous slugs and oil slugs, wherein said sequence contains at least one aqueous slug and at least one oil slug, and wherein said sequence contains a plurality of at least one of said aqueous slugs and oil slugs; and disposing an air slug between each adjacent aqueous and oil slug within the sequence; wherein the aqueous slugs contain at least one reagent; and wherein the oil slugs comprise an oil medium having at least one hydrophobic substance disposed therein.

In another aspect, sensors are used during slug delivery to confirm the placement and delivery of individual slugs. A non-limiting example is the use of optical sensors which rely on the color or refractive index of each slug.

Another aspect incorporates the use of multiple fluid delivery lines within an overall unit. In such "multiplex" systems, each line may be dedicated to a discreet sample, and multiple samples may be run within the testing unit.

DETAILED DESCRIPTION

Figure 1:
FIG. 1 depicts the initial disposition of the slugs in EXAMPLE 1.

While the devices and methodologies, such as those described by Asano et al., possess certain beneficial features and advantages, they also overlook several challenges prevalent in the field. For instance, these solutions often necessitate specialized channel designs or operational settings tailored specifically to the fluids involved in the transfer process. Additionally, they overlook the critical issue of maintaining the stability of stored discrete liquid volumes in the face of physical disruptions like jarring or vibration—common occurrences in numerous applications, which can result in the mixing of previously separated slugs. The strategy employed by Asano et al. depends on cumbersome and intricate flow control mechanisms, such as mechanical or fluidic valves, to achieve the outlined contactless mass transfer. However, these elements introduce additional bulk, complexity, and cost to the device. Moreover, Asano et al.'s approach does not tackle the problems of evaporation and unwanted mixing within the microchannels, issues that can significantly alter the chemical composition of the separated aliquots, particularly when long-term storage in the microchannels is required. Furthermore, Asano et al. does not offer a solution for the controlled recombination of slugs when needed.

It has now been found that the foregoing issues may be addressed with the systems and methodologies disclosed herein. These systems and methodologies provide a robust solution to the challenges prevalent in microfluidic systems and fluid handling technologies.

Some embodiments of the systems and methodologies disclosed herein employ a versatile microchannel system that does not rely on specialized channel designs or operational settings tailored to specific fluids. This universality is achieved through the use of discrete slugs separated by partitions of liquid, gas, or solidifiable oils, which act as separators without the need for fluid-specific adaptations. This approach significantly simplifies the design process and enhances the flexibility of the system and its ability to handle a wide variety of fluids without additional modifications.

Some embodiments of the systems and methodologies disclosed herein address the issue of stability against physical disturbances (such as, for example, jarring or vibration) through the incorporation of innovative separator materials that provide enhanced stability to the stored discrete liquid volumes. The use of solidifiable oil slugs in some embodiments introduces a novel method for creating stable, physical barriers between slugs. These barriers maintain separation and prevent mixing, even under conditions that would typically lead to slug disintegration and merging in other systems.

Some embodiments of the systems and methodologies disclosed herein also eliminate the need for bulky and complex flow control mechanisms by foregoing mechanical or fluidic valves altogether. Instead, the control of fluid flow and slug separation may be achieved through the strategic placement and manipulation of the separator materials. This not only reduces the bulk and complexity of the device but also significantly cuts down on the associated costs.

Some embodiments of the systems and methodologies disclosed herein also address the challenges of evaporation and undesired mixing within the microchannels head-on. By employing separators that can adjust to environmental conditions, such as solidifying oils that create impermeable barriers, these systems and methodologies minimize evaporation and prevent chemical alteration of the stored aliquots. This ensures that the chemical properties of the fluids remain intact over extended periods, which may be a critical requirement for many applications, especially where it is necessary to store such fluids for a significant amount of time prior to subjecting them to analysis.

Some embodiments of the systems and methodologies disclosed herein also offer a unique solution for the controlled recombination of slugs when desired. Through the reversible nature of the separator materials-such as the phase change properties of solidifiable oils—these embodiments enable on-demand recombination of slugs. This feature is crucial for applications requiring precise mixing and reaction initiation, providing users with unparalleled control over the process.

It will be appreciated from the foregoing that the systems and methodologies disclosed herein provide a comprehensive solution for precise fluid storage, handling, and delivery in microfluidic systems, overcoming many existing challenges related to fluid versatility, system stability, design simplicity, and controlled recombination of fluids. These improvements address practical limitations in microfluidic technologies and broaden the scope of applications beyond those addressed by systems focused solely on contactless mass transfer.

Some of the features and advantages of the systems and methodologies disclosed herein are further exemplified in the following particular, nonlimiting examples.

Example 1

This example illustrates the stability and integrity of oil and aqueous slugs contained within flexible polymer tubing, and in particular, the migration issues faced with this tubing.

A portion of Tygon® vinyl tubing (1/16" internal diameter) was obtained from Saint-Gobain Performance Plastics. A syringe was employed to introduce an oil slug followed by a slug of Gatorade® sports beverage into the tubing. Red Gatorade was utilized in this example, as it is an aqueous solution providing a ready visual indicia of aliquot stability. This setup was intended to mimic the operational configuration of the microchannel fluid storage and delivery system, with particular attention to the interface between the oil and aqueous slugs. After the slugs were positioned within the tubing, they were left undisturbed for a period of approximately one minute to observe any potential migration or mixing phenomena.

Figure 2:
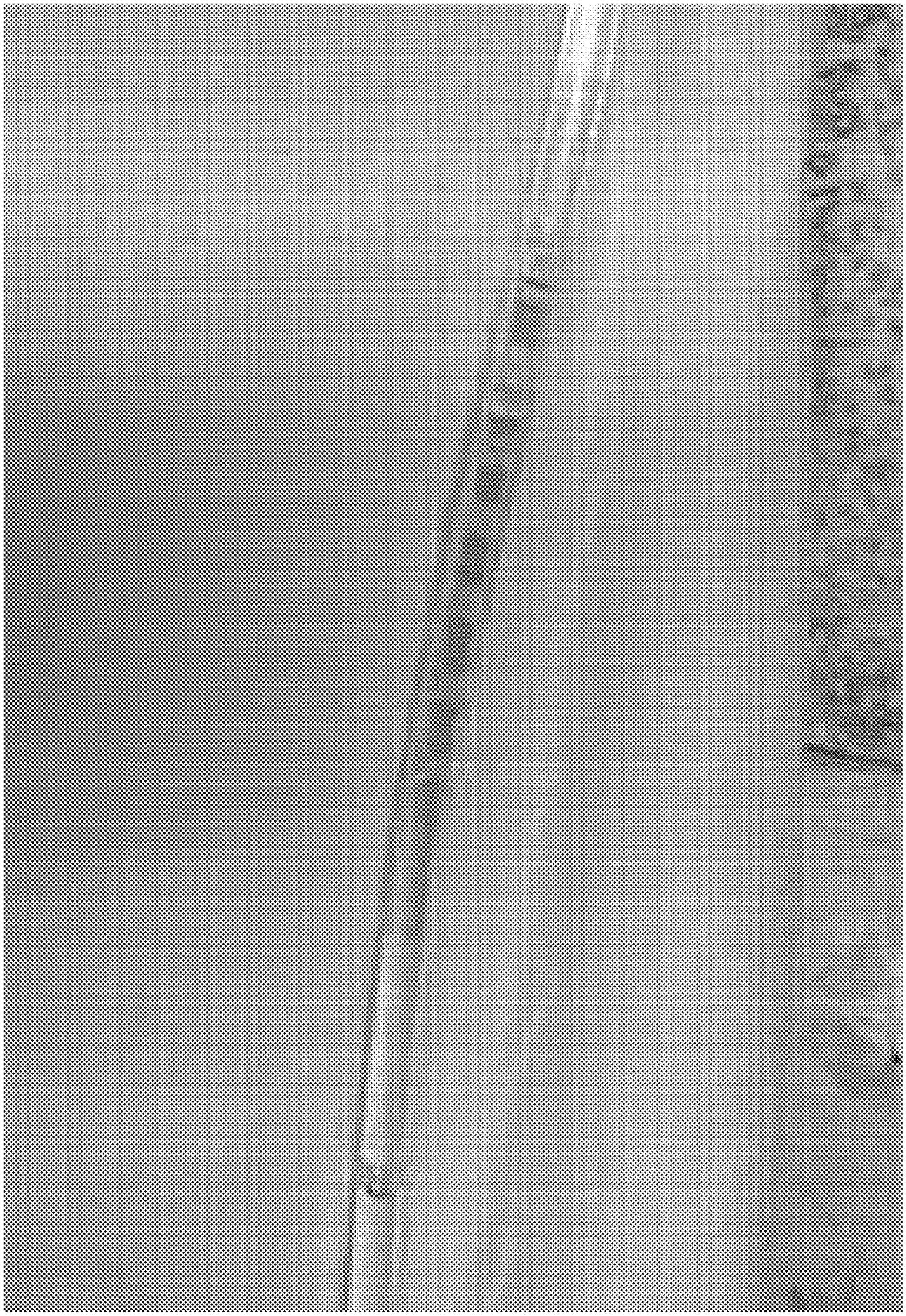
FIG. 2 depicts the disposition of the slugs in EXAMPLE 1 after 1 minute.

Upon introduction into the tubing, the oil and Gatorade slugs maintained distinct separation, indicating initial stability of the system for separating and storing different fluid phases (see FIG. 1). However, within the short observation period of one minute, some degree of oil migration around the Gatorade slug was noted (see FIG. 2). This migration suggested a potential for mixing or loss of distinct separation over time, particularly in the absence of additional stabilizing mechanisms.

EXAMPLE 1 underscores the necessity of carefully selecting the materials and configurations for the microchannel system to ensure the stability and integrity of separated fluid slugs. The noted migration of oil around the aqueous slug highlights potential challenges in maintaining distinct separation over time and points to the need for a further means to enhance system stability.

Example 2

EXAMPLE 1 was repeated using glass pipette tubing of similar diameter to the vinyl tubing, this time using subsequent aliquots of oil and water.

Figure 3:
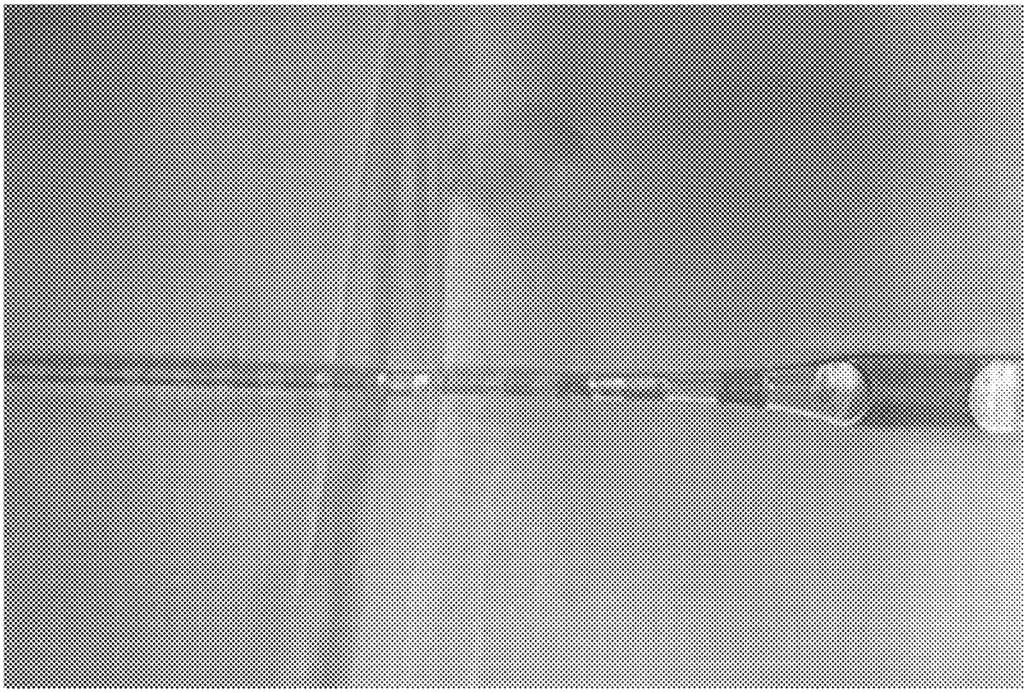
FIG. 3 depicts the disposition of the slugs in EXAMPLE 2.

The introduction of oil slugs into the glass pipette resulted in a noticeable coating of the pipette's inner surface by the oil, altering the surface properties relevant to fluid interactions (see FIG. 3). In particular, following the coating of the glass surface by the oil, the subsequent introduction of water revealed challenges in maintaining discrete separation between the two. The water-based solution displayed a reduced tendency to form well-defined plugs, suggesting a diminished capacity for stable slug segregation within the oil-coated glass pipette.

Example 3

This example illustrates the effect of reduced tubing internal diameter on the stability and separation of alternating slugs of oil and aqueous solutions within polytetrafluoroethylene (PTFE) tubing. This experiment aimed to determine the potential for improved segregation and reduced mixing between oil and water slugs, critical for the operational efficiency of the microchannel fluid storage and delivery system.

PTFE tubing was utilized which had an internal diameter closely matching that of the hypodermic needle used for slug introduction. The needle gauge (20 gauge, 0.91 mm OD) suggested a tubing ID of approximately 0.9 mm. The selected fluids for slug formation were soy sauce (to simulate an aqueous reagent) and sesame oil (to represent an oil phase).

Figure 4:
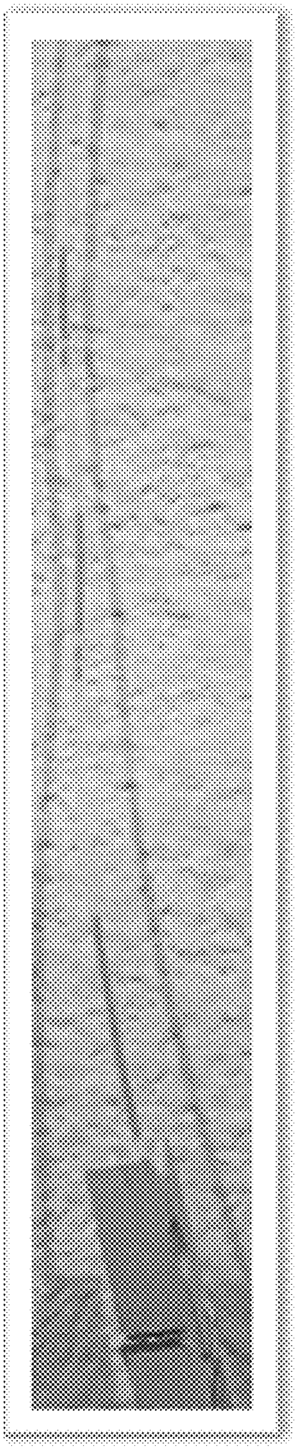
FIG. 4 depicts the initial disposition of the slugs in EXAMPLE 3.

Using the hypodermic needle, alternating slugs of soy sauce and sesame oil were carefully introduced into the PTFE tubing (see FIG. 4). The tubing was then suspended vertically for approximately 18 hours. This setup allowed for the observation of any potential movement or mixing between the slugs over an extended period, thereby testing the stability of the segregation system under conditions of minimal external disturbance.

Figure 5:
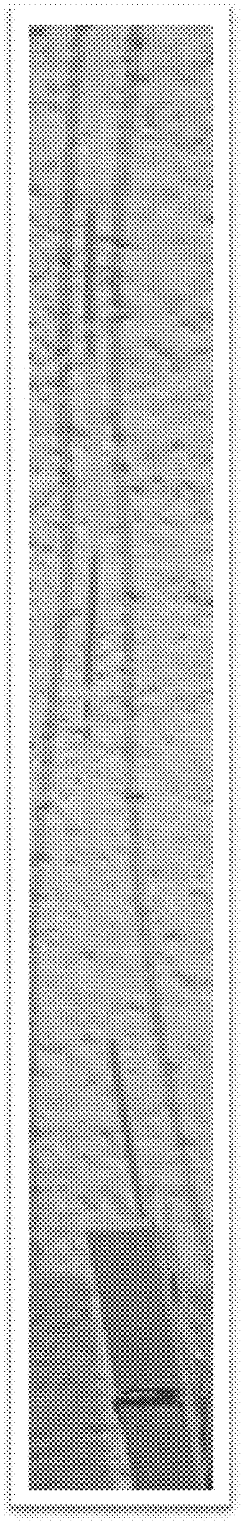
FIG. 5 depicts the disposition of the slugs in EXAMPLE 3 after 18 hours.

After the 18-hour observation period (see FIG. 5), the soy sauce and sesame oil slugs remained distinctly separated, with no visible mixing or movement observed. This outcome demonstrates the effectiveness of the reduced internal diameter of the PTFE tubing in maintaining stable separation between oil and aqueous slugs.

The successful segregation of the slugs in the PTFE tubing with a reduced internal diameter highlights the significance of both material selection and geometric considerations in designing a microchannel system capable of reliably handling discrete fluid phases without cross-contamination.

Example 4

This example illustrates the impact of surfactants on the stability and mixing behavior of oil and aqueous slugs within PTFE tubing. In particular, this example shows how the presence of surfactants in aqueous solutions influences the integrity of microchannel separation between oil and water phases, which is crucial for applications involving surfactant-containing reagents.

Figure 6:
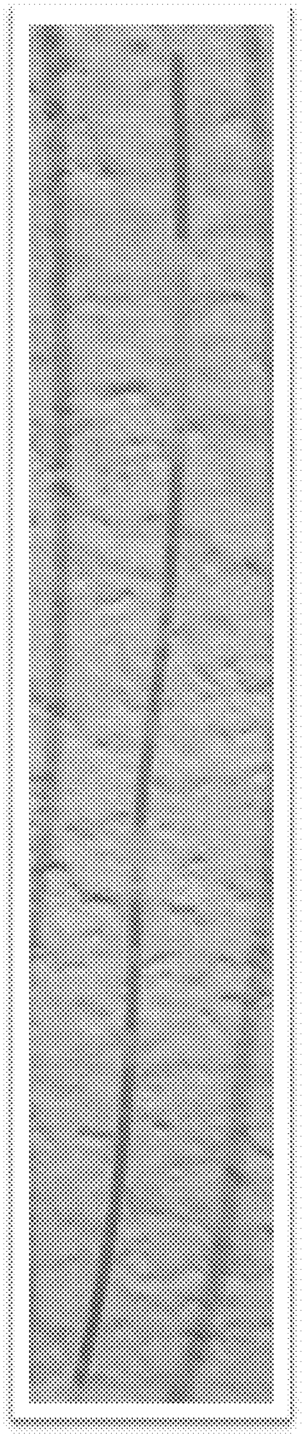
FIG. 6 depicts the initial disposition of the slugs in EXAMPLE 4.

The materials used in this experiment included PTFE tubing with an internal diameter of approximately 0.9 mm, olive oil as the oil phase, and a mixture of soy sauce and hand soap as the aqueous phase containing surfactants. Alternating slugs of soy sauce and sesame oil were pulled into the tubing. (see FIG. 6). The tubing was then suspended vertically to simulate conditions of minimal disturbance, and the setup was observed over a period of 12 hours to assess any changes in slug integrity or evidence of mixing attributable to the surfactant's presence.

Figure 7:
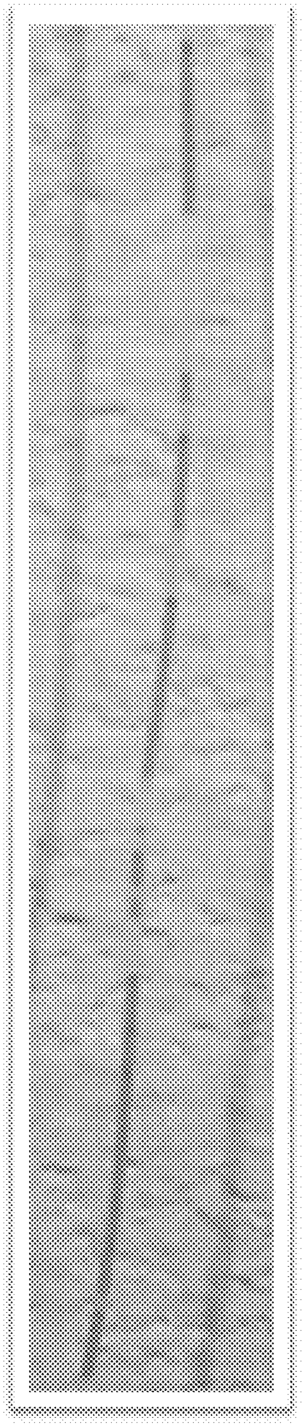
FIG. 7 depicts the disposition of the slugs in EXAMPLE 4 after 12 hours.

After the period of observation (see FIG. 7), some degree of mixing between the olive oil and the surfactant-containing aqueous solution was noted. This mixing was presumed to be facilitated by the surfactant, which can reduce the surface tension between oil and water, leading to increased interaction and potential mixing of the phases.

Despite the presence of surfactants and observed mixing, the experiment also suggested that air slugs might be playing a role in separating some of the water-oil interfaces, indicating a potential method to enhance stability in surfactant-present systems.

This example highlights the significant role surfactants may play in influencing the stability and separation of oil and aqueous slugs within a microchannel system. The observed mixing between oil and surfactant-containing aqueous solutions underscores the need for careful consideration of surfactant effects when designing and operating fluid storage and delivery systems, especially in applications involving surfactant-rich reagents. Additionally, the potential utility of air slugs as a stabilizing mechanism in the presence of surfactants offers a promising avenue for further research and development, aiming to optimize slug integrity and segregation in complex fluid systems.

Example 5

This example demonstrates the effectiveness of introducing air gaps as separators to enhance the stability and separation of oil and aqueous slugs within PTFE tubing. This investigation aimed to determine the role of air gaps in preventing the mixing of oil and aqueous phases, which may be critical for the precision handling of reagents in some microfluidic applications.

This experiment employed PTFE tubing with an internal diameter suitable for the study, along with oil and soy sauce to represent the oil phase and aqueous phase, respectively.

Figure 8:
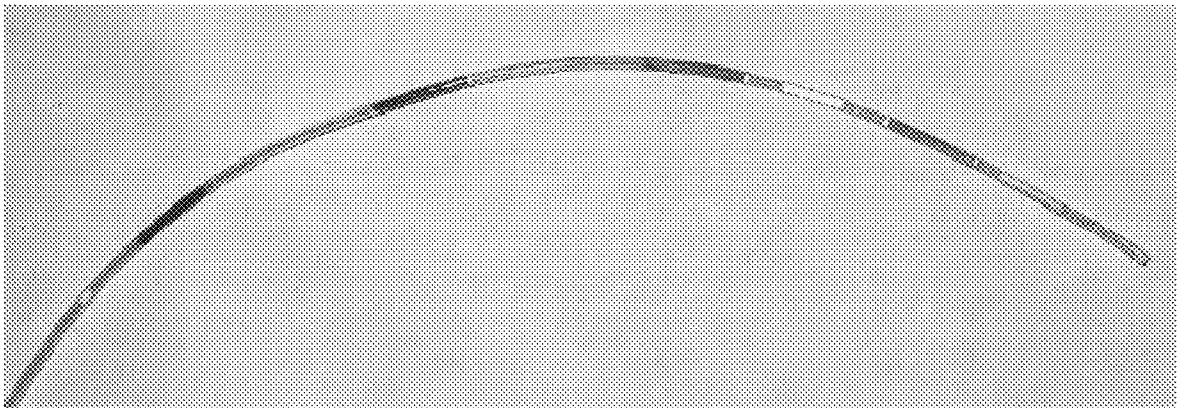
FIG. 8 depicts the initial disposition of the slugs in EXAMPLE 5.

The experiment involved the creation of four slugs within the PTFE tubing: two soy sauce slugs to simulate aqueous reagents and two oil slugs. Air gaps were introduced between each slug to serve as separators (see FIG. 8). Following the setup, the arrangement was observed to assess the stability of the separation over time and to evaluate the ability of the air gaps to prevent the mixing of the oil and aqueous phases.

Figure 9:
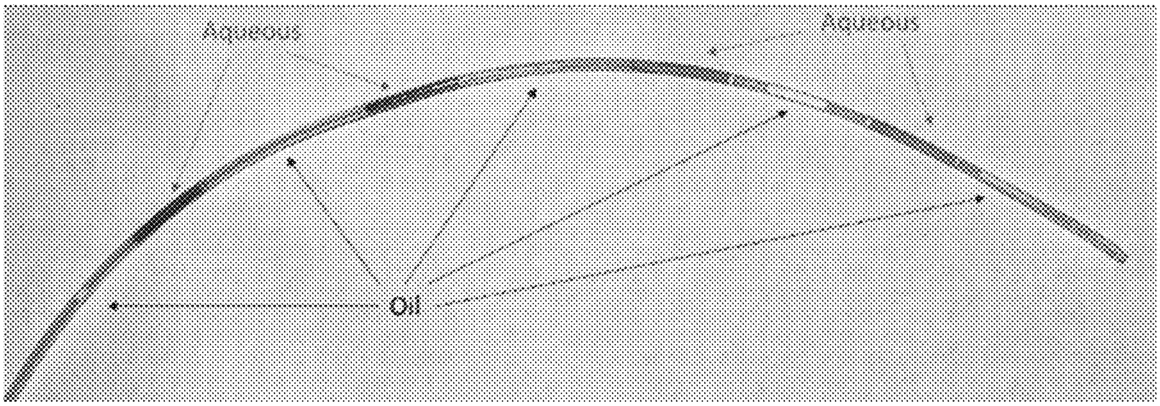
FIG. 9 depicts the disposition of the slugs in EXAMPLE 5 over time.
Figure 10:
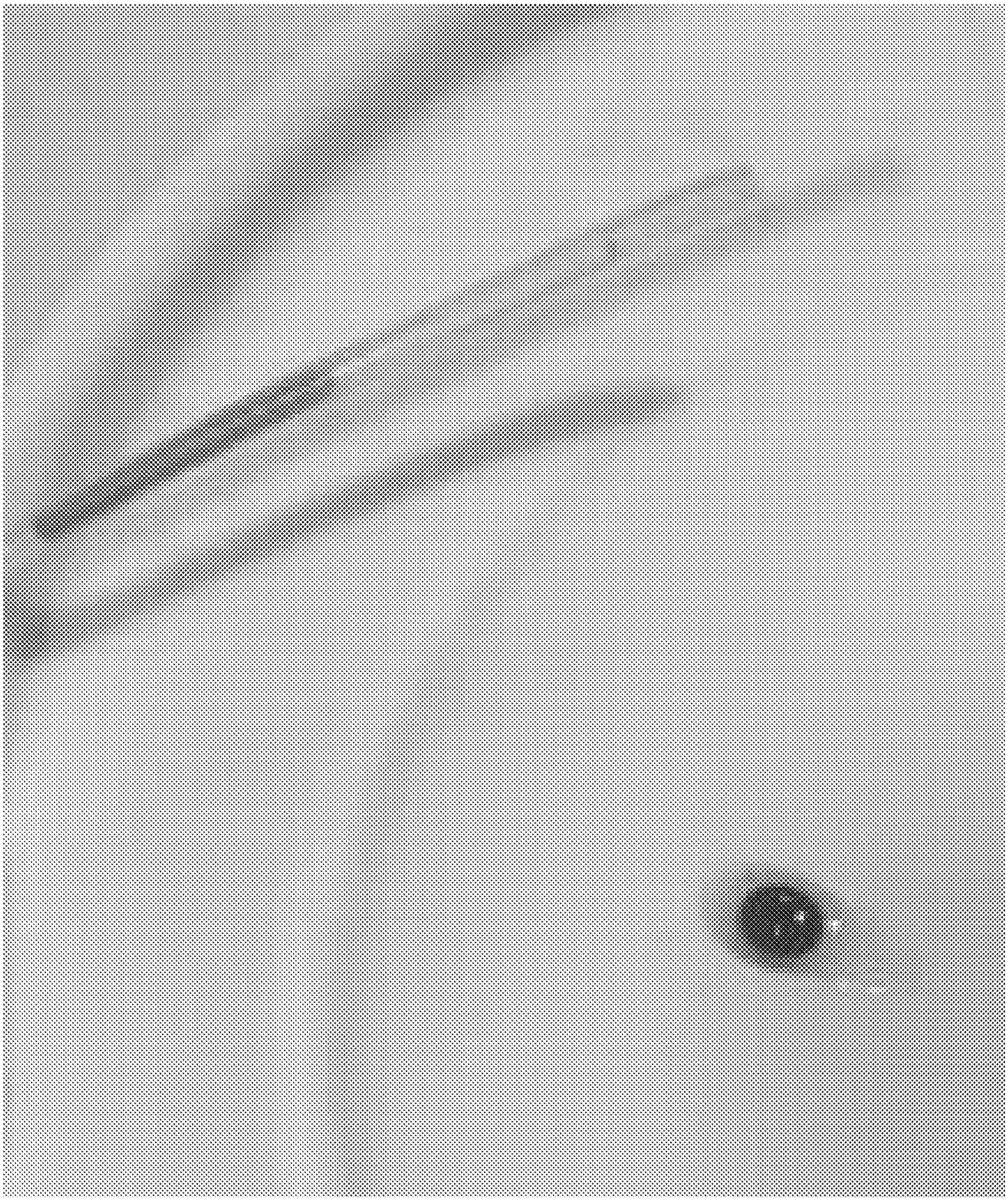
FIGS. 10-11 depict the recombination of oil and water slugs in EXAMPLE 5.
Figure 11:
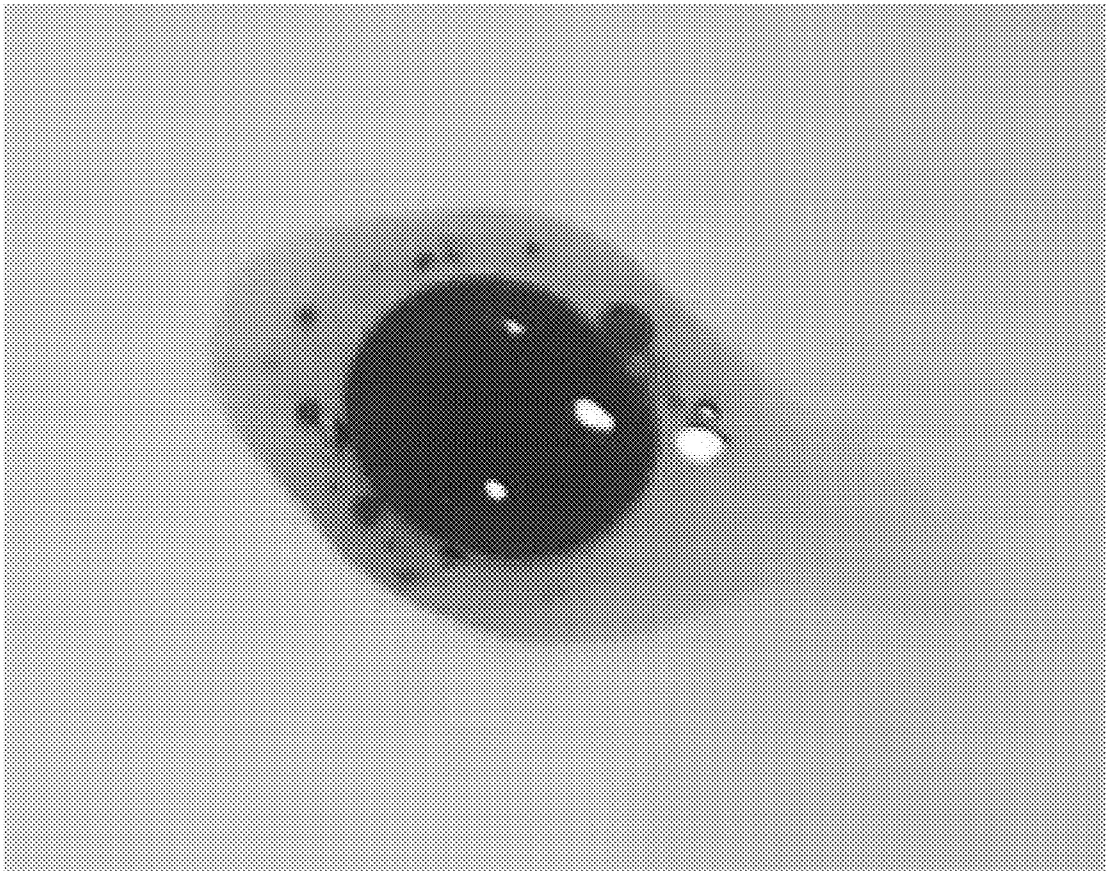

The introduction of air gaps between the oil and aqueous slugs successfully maintained distinct separation (see FIG. 9), demonstrating that air serves as an effective barrier to prevent mixing between the phases. Furthermore, the experiment showed that the slugs could be recombined into their respective layers (oil and water) after being separated by air gaps (see FIGS. 10 and 11). This recombination was achieved without the mixing of the two phases, indicating the potential for controlled reagent delivery and mixing on demand.

This example demonstrates the effectiveness of air gaps as a simple yet powerful method for enhancing the separation and stability of oil and aqueous slugs within microchannel systems. The ability of air gaps to maintain distinct phases and enable controlled recombination presents significant advantages for microfluidic applications, particularly in scenarios requiring precise handling and delivery of multiple reagents. This finding underscores the potential of air gaps to contribute to the efficiency and reliability of microchannel fluid storage and delivery systems, offering a straightforward solution to the challenge of phase mixing in complex fluidic environments.

Example 6

This example explores the use of solidifying oils as separators to enhance the long-term stability of aqueous slugs stored within PTFE tubing. This innovative approach sought to determine whether the physical state change of oil from liquid to solid could serve as an effective method to prevent the mixing of aqueous slugs, even under conditions that might otherwise promote such undesired interactions.

The experiment utilized PTFE tubing with an appropriate internal diameter for the study, water colored with green dye to visualize the aqueous slugs, air slugs to initially separate the aqueous phases, and coconut oil, chosen for its property of solidifying at lower temperatures.

The PTFE tubing was filled with alternating slugs of green-colored water and coconut oil, with air slugs introduced between each to facilitate initial separation.

Figure 12:
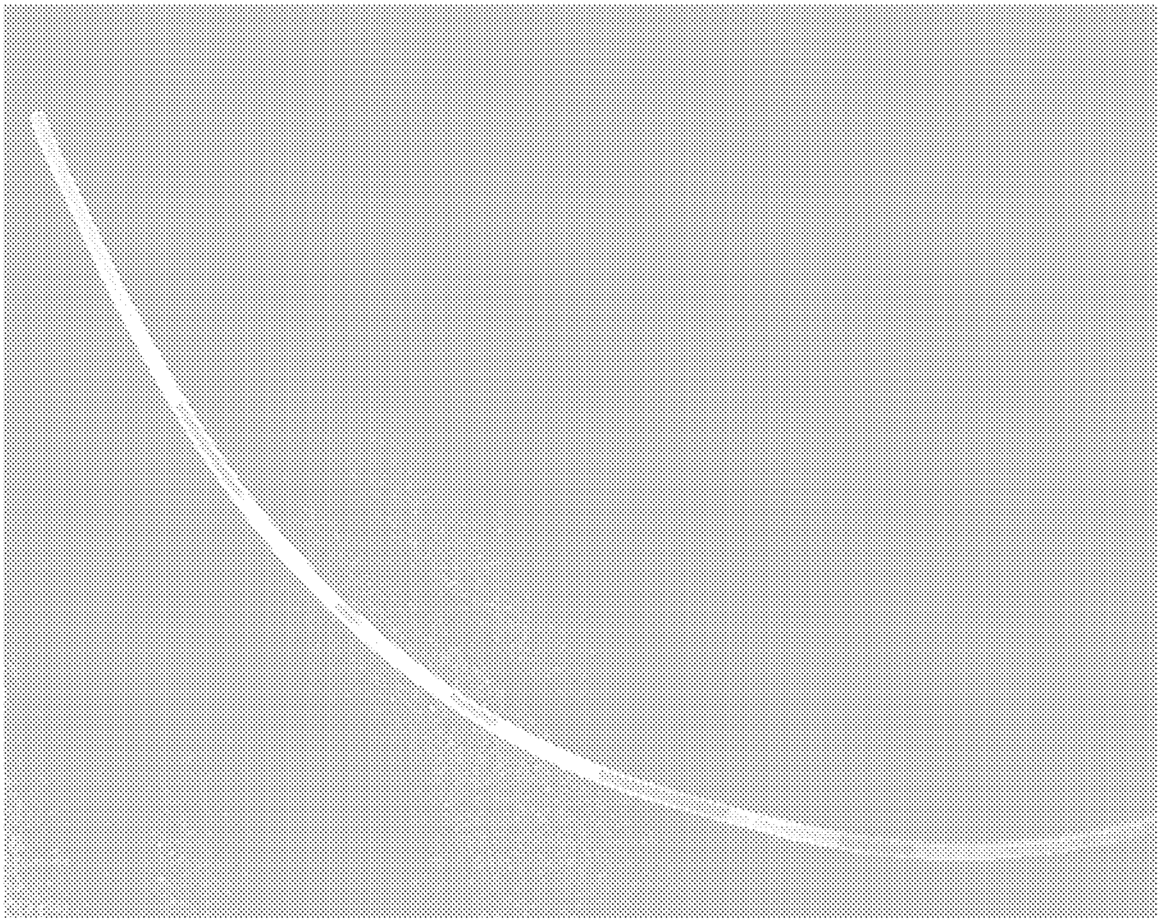
FIG. 12 depicts the disposition of the slugs in EXAMPLE 6.

After the setup was complete, the tubing was chilled to approximately 20° C. to induce the solidification of the coconut oil slugs, effectively creating solid barriers between the aqueous slugs (see FIG. 12).

Observations were made to assess the stability of the aqueous slugs and the integrity of the solid oil barriers over time. Additionally, the behavior of the system was monitored during a gentle warming process to evaluate the reversibility of the oil's solidification.

The solidification of coconut oil effectively prevented any mixing of the green-colored water slugs, demonstrating the viability of using solidifying oils as a method for maintaining long-term stability and separation. Upon gently warming the tubing, the solidified coconut oil returned to its liquid state without causing disturbance or mixing of the aqueous slugs, suggesting that the process is reversible and can be controlled based on the desired application requirements.

This example provides a compelling demonstration of the potential benefits of using solidifying oils as separators in microchannel systems for fluid storage and delivery. The solidification of coconut oil at lower temperatures created stable barriers that effectively maintained the separation and integrity of aqueous slugs over an extended period. This approach not only enhances the system's reliability in preserving sample and reagent integrity but also offers a reversible mechanism for controlled fluid handling and delivery. The findings from this experiment underscore the innovative application of phase change materials in microfluidics, opening new avenues for improving the performance and versatility of fluid storage and delivery technologies.

Example 7

This example demonstrates the controlled recombination of oil and aqueous slugs within a microchannel system, specifically focusing on the behavior of these slugs when mixed under controlled conditions. This experiment aimed to validate the concept that distinct fluid phases, when stored as separate slugs within the system, could be combined on demand to initiate specific reactions or processes, a critical capability for applications requiring precise fluid handling and mixing.

This experiment utilized PTFE tubing as the microchannel system, with green-colored water to represent the aqueous phase and avocado oil for the oil phase. The choice of materials ensured clear visibility of the slugs and their interactions during the experiment.

The PTFE tubing was prepared with alternating slugs of green-colored water and avocado oil, ensuring that each phase was distinctly separated to simulate the storage condition within the microchannel system. The tubing setup was then subjected to a controlled environment where the slugs were gently manipulated to encourage recombination. The primary focus was on observing the behavior of the aqueous slugs as they came into contact with each other and the oil, assessing the ease and effectiveness of the recombination process.

Upon introducing the slugs into the tubing, the green-colored water and avocado oil formed distinct layers, with no immediate mixing observed, indicating successful separation and storage of different fluid phases.

Figure 13:
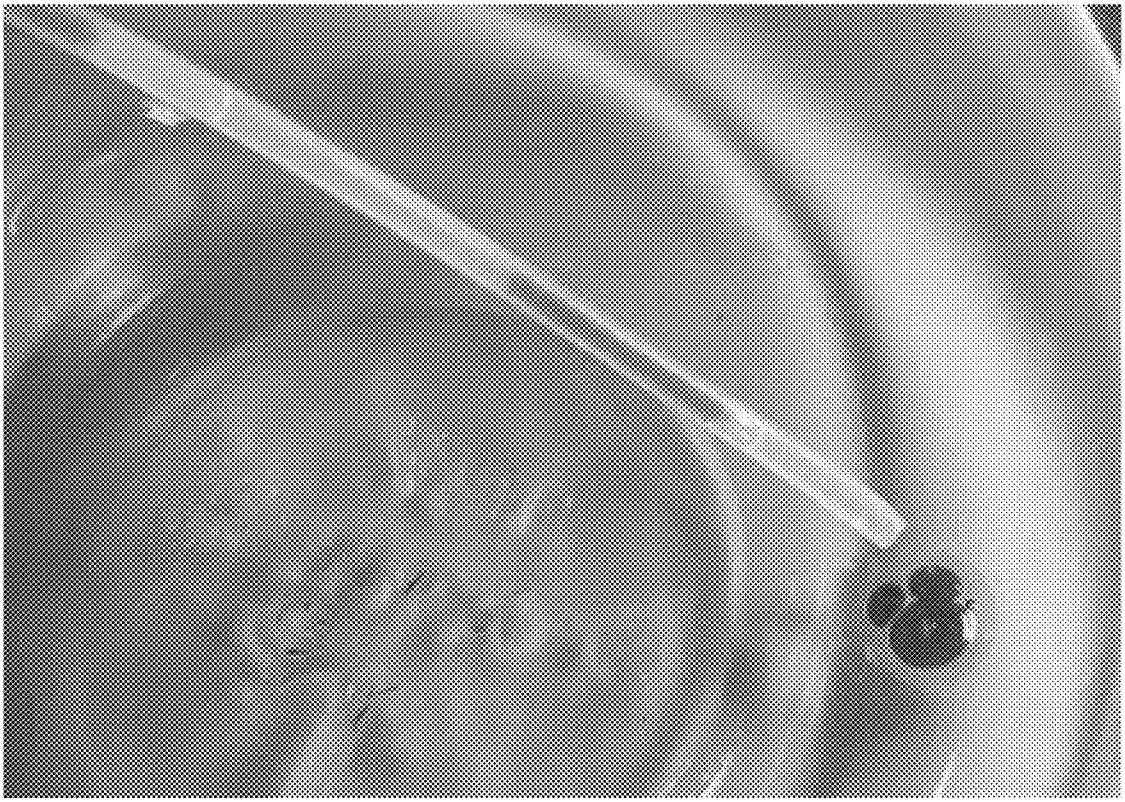
FIGS. 13-15 depict the recombination of the slugs in EXAMPLE 6.
Figure 14:
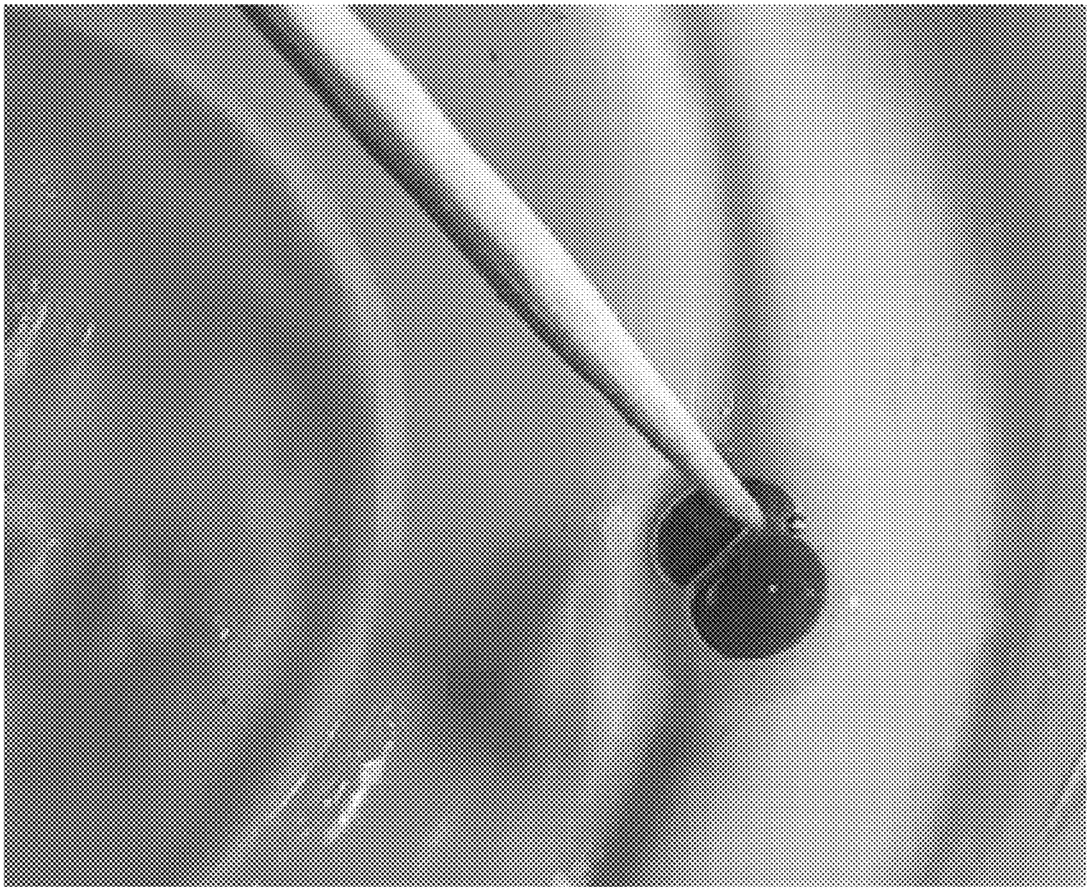
Figure 15:
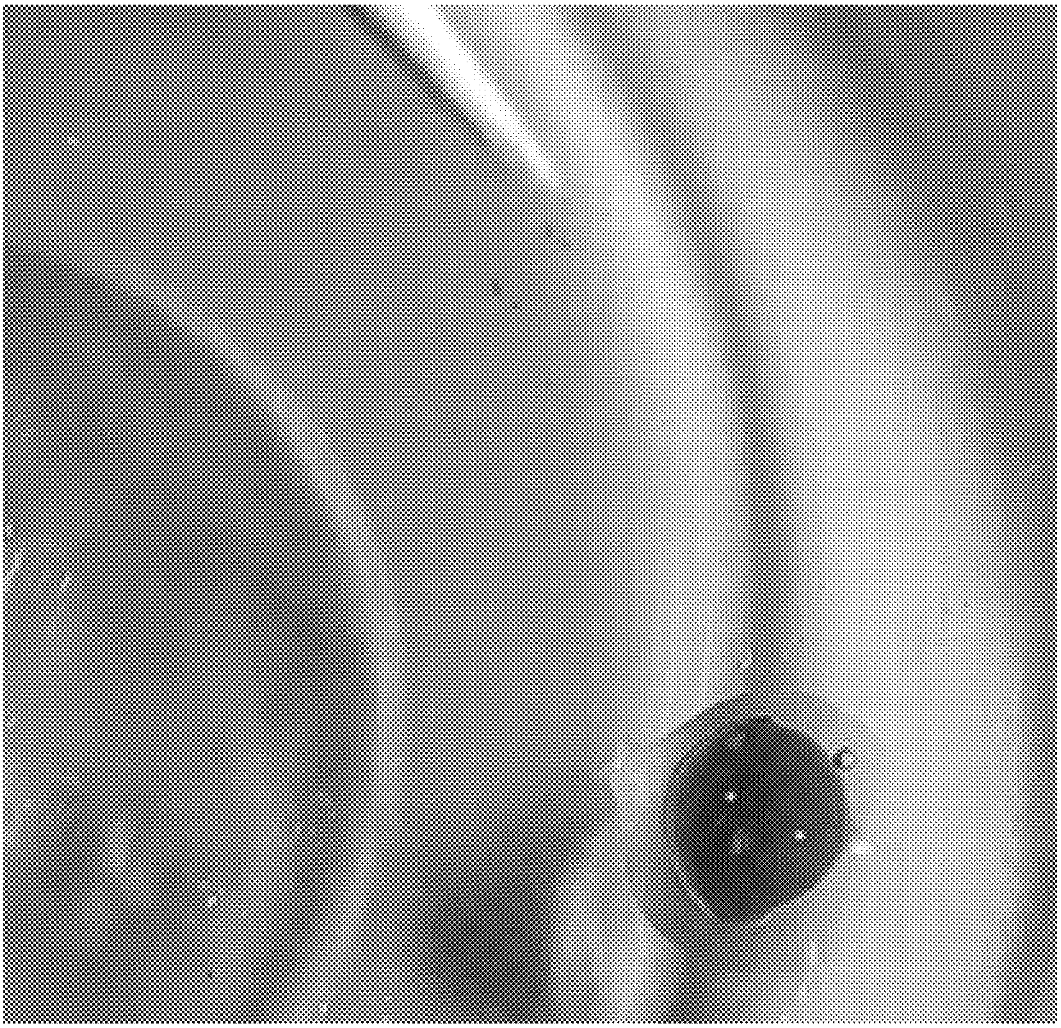

When the aqueous slugs were induced to combine, they initially formed separate droplets within the oil phase (see FIG. 13). However, upon gentle manipulation, such as prodding with a toothpick (see FIG. 14), the aqueous slugs coalesced into a single continuous phase (see FIG. 15), demonstrating the ability to control the recombination process effectively.

This example successfully demonstrated the potential of the microchannel fluid storage and delivery system to achieve controlled recombination of distinct fluid phases. This capability is particularly valuable for applications requiring precise timing and conditions for the mixing of reagents or samples. The ability to store fluids as separate slugs and then combine them on demand offers significant advantages in terms of flexibility, efficiency, and precision in fluid handling. This experiment reinforces the system's utility in a wide range of scientific and industrial applications, highlighting its innovative approach to overcoming traditional challenges in microfluidic technologies.

The foregoing examples demonstrate the ability of the microchannel fluid storage and delivery systems disclosed herein to handle discrete fluid aliquots with enhanced precision, stability, and control. These examples demonstrate the importance of various aspects of the system, including material selection, tubing dimensions, the chemical composition of fluids, and the use of air gaps and solidifying oils as separators. These experiments affirm the potential of the system for broad applicability in chemical and biological processing and highlight its ability to overcome traditional challenges in microfluidics through the strategic use of materials, dimensions, and fluid properties. The ability of these systems to store and deliver discrete fluid aliquots without evaporation or mixing, leveraging oil slugs, air gaps, and solidifying fluids, represents a significant advancement in fluid management technology.

The devices and methodologies disclosed herein may be utilized in a variety of microfluidics devices. Such devices will typically include a network of microchannels, with dimensions tailored to support the introduction, storage, and delivery of discrete aqueous and oil slugs separated by air gaps. These microchannels may be etched or molded into a substrate made from materials such as glass, semiconductors, or plastics that are compatible with a wide range of chemical and biological reagents. The microchannels may also take the form of tubing comprising glass or polymers such as, for example, polymethyl methacrylate (PMMA), PFA, polydimethylsiloxane (PDMS), or various fluoropolymers such as polytetrafluoroethylene (PTFE).

Such devices will also typically be equipped with multiple integrated reservoirs or inlets designed for the loading of different reagents (aqueous slugs) and oil mediums (oil slugs). These inlets may be connected to external pumps or syringes for precise control over slug introduction into the microchannels.

In order to implement the methodologies disclosed herein, such devices will preferably be equipped with a suitable mechanism for the controlled introduction of air gaps between each aqueous and oil slug. This may be achieved, for example, through precise control of fluid injection rates or by incorporating microvalves that temporally separate the injection of aqueous and oil slugs with intervals of air.

Such devices will also typically be equipped with a plurality of zones equipped with sensors or detectors for real-time monitoring of the slugs as they pass through the microchannels. These zones may be utilized to verify the integrity of the slugs, monitor for potential mixing, and ensure the proper sequence of slugs is maintained.

Such devices may also be equipped with designated areas within the microchannel network that serve as reaction chambers where specific conditions (for example, temperature, light, electric fields) may be applied to initiate or accelerate reactions between reagents contained within the aqueous slugs. The chambers may be designed for single or multiple uses, depending on the application.

Such devices will also typically be equipped with outlet ports for the extraction of reaction products or for the delivery of reagent mixtures to external environments or additional analytical instruments. These outlets may also be designed to facilitate the controlled recombination of slugs under specific conditions.

Such devices may also be equipped with an integrated control system, possibly including a microcontroller and associated software, allows for automated operation of the device. This system controls the timing, volume, and sequence of slug introduction, as well as the activation of reaction chambers and monitoring zones.

Such devices are preferably modular in design, thus allowing for easy reconfiguration of the microchannel network, reaction chambers, and monitoring zones to suit different experiments or processes.

The foregoing microfluidic devices, when used in conjunction with the devices and methodologies disclosed herein, offer a versatile and powerful platform for conducting a wide array of microscale fluid manipulations with high precision and minimal risk of cross-contamination or undesired mixing. Applications of these devices span across research, diagnostics, drug development, and many other fields where precise fluid handling and analysis is required.

The dimensions of the microchannels (tubing or microchannel) may play an important role in the performance and reliability of the microchannel fluid storage and delivery systems disclosed herein. These dimensions will preferably be selected taking into account such factors as preventing mixing between adjacent slugs, maintaining slug integrity against physical disturbances, and facilitating controlled recombination of slugs (where desired).

The internal diameter of the tubing is preferably less than 1 mm, and more preferably within the range of 0.01 mm to 0.1 mm. Internal diameters in this range are found to be effective in preventing mixing between adjacent slugs and maintaining the discrete nature of the slugs over time. An internal diameter of approximately 0.9 mm is preferred, especially when the tubing material is PTFE.

Tubing of various lengths may be utilized in the systems and methodologies disclosed herein. While specific lengths may be dictated by application requirements, it is typically desirable that the tubing is long enough to accommodate multiple discrete slugs with sufficient separators in between. Preferably, tubing lengths within the range of 10 cm to 3 m, and more preferably 30 cm to 1 m, are utilized.

Tubing of various wall thicknesses may be utilized in the systems and methodologies disclosed herein. The wall thickness of the tubing may be chosen to ensure durability and resistance to physical jarring or vibration, while maintaining flexibility for easy handling. Preferably, wall thicknesses in the range of about 0.1 mm to about 1 mm are preferred, as these thicknesses offer a reasonable balance between durability and flexibility.

Various materials may be utilized in the construction of the tubing or microchannels in the systems and methodologies disclosed herein. The use of materials such as polytetrafluoroethylene (PTFE) which present omniphobic surface properties is especially preferred, although some embodiments may utilize other materials that have desirable hydrophobic or oleophobic characteristics. Preferably, the choice of materials affords a surface which has little or no unwanted interactions with the slugs.

Various dimensions of separator slugs or partitions may be utilized in the devices and methodologies disclosed herein. When air gaps are used as separators, the length of the gap will preferably be selected to prevent slug mixing due to diffusion or physical movement. This will typically be in the range of 2 mm to 30 cm, depending on such considerations as the slug sizes and the system's sensitivity to mixing. For oil slugs, considerations for viscosity and solidification properties may influence or dictate the optimal size.

Various modifications may be made to the systems and methodologies disclosed herein without departing from the scope of the invention.

For example, the microchannel fluid storage and delivery system disclosed herein has been frequently described with reference to the use of air as a gaseous separator to prevent mixing between fluid slugs. However, in some embodiments, other gases may be utilized in addition to, or as an alternative to, air. Such other gases may include, for example, nitrogen, carbon dioxide, argon, helium, hydrogen, or various gas mixtures.

For example, in some embodiments, nitrogen may be utilized as an inert gas to prevent oxidation reactions within the microchannel. Because it is chemically inert, the use of nitrogen may be preferable for handling sensitive chemicals or biological materials that might degrade or react in the presence of oxygen. Argon may provide similar benefits to nitrogen, but its higher density may make it preferable in applications where it is desirable to increase or maximize the differential density between the gas and liquid phases for better separation stability. The low density and non-reactivity of helium (and its low solubility in liquids) may make it a preferable choice for some applications requiring minimal interaction with the slugs, while also helping to maintain slug integrity.

The use of carbon dioxide may be advantageous in applications where a slight acidification could be beneficial, such as in controlling the pH of a solution without adding liquid acids. However, its solubility in water should be considered as it may affect the volume and properties of aqueous slugs. Similarly, hydrogen may be useful in systems where reducing environments are desirable or necessary, although due consideration would need to be given to its flammability and the need for safe handling practices.

In some applications, custom gas mixtures may be engineered to create optimal conditions within the microchannel. This may involve, for example, mixing inert gases with small amounts of reactive gases to achieve specific chemical or biological conditions.

The incorporation of solidifiable oils and air gaps in some embodiments of the systems and methodologies disclosed herein represents a significant advancement in microfluidic systems for fluid storage, handling, and delivery. However, various other materials or substances may be utilized as effective partitions in embodiments of these systems and methodologies.

For example, magnetically responsive fluids (such as, for example, iron oxide ferrofluids, cobalt ferrofluids, nickel ferrofluids, manganese zinc ferrite ferrofluids, and metal alloy ferrofluids) may be utilized as partitions in some embodiments to introduce dynamic control over fluid segmentation and recombination through external magnetic fields. This approach may allow for the rapid and precise manipulation of fluid segments within the microchannel system without direct physical contact. For example, magnetically responsive fluids may be strategically positioned to create temporary barriers that can be moved or removed by adjusting the magnetic field, facilitating complex fluid manipulations and processing sequences. This feature may be particularly useful in applications requiring sequential chemical reactions or in the creation of gradient mixtures. Magnetically responsive fluids that may be utilized for this purpose may include, for example, colloidal liquids made of nanoscale ferromagnetic or ferrimagnetic particles suspended in a carrier fluid. These particles are typically coated with a surfactant to prevent clumping and ensure even distribution within the carrier liquid. When exposed to a magnetic field, the particles within these fluids become magnetized, allowing the fluid to respond dynamically to the magnetic field's presence.

As a further example, temperature-responsive polymers may be utilized as partitions in some embodiments. Such polymers undergo a physical transformation at specific temperatures that may provide a versatile mechanism for fluid segregation and integration. By employing polymers that transition from liquid to solid states (or vice versa) upon temperature changes, the microchannel system may achieve reversible fluid partitioning with simple thermal control. This capability may facilitate the on-demand separation or mixing of fluid segments, supporting a wide range of biochemical processes that are temperature-sensitive, including enzyme reactions, protein folding studies, and controlled drug delivery systems.

In some embodiments, biodegradable materials may be utilized for fluid partitions to enhance the environmental sustainability of microfluidic systems. Biodegradable partitions may be designed to degrade under specific conditions (e.g., pH, enzymatic activity, or time), thereby offering a controlled mechanism for fluid release or mixing. This approach may be particularly advantageous in single-use diagnostic devices, environmental monitoring applications, or systems where post-use degradation minimizes waste and eliminates the need for manual cleanup. Moreover, biodegradable materials may be tailored to respond to biological signals, opening new possibilities for biosensing and medical applications where fluid manipulation is synchronized with physiological processes. Some particular, nonlimiting examples of biodegradable materials which may be utilized in the systems and methodologies described herein include polylactic acid (PLA), polyhydroxyalkanoates (PHAs), polyglycolic acid (PGA), polycaprolactone (PCL), polybutylene succinate (PBS), poly(butylene adipate-co-terephthalate) (PBAT), starch-based polymers, cellulose acetate, polypeptides and proteins, and chitosan.

Various microfluidic devices may be made in accordance with the teachings herein. Such devices may contain a variety of features or elements, including microchannel networks, reservoirs, inlets, mechanisms for introducing air gaps, detection and monitoring zones, reaction chambers, outlet ports, and control systems. Such devices may be modular in design.

It will be appreciated that the integration of suitable materials into microchannel systems of the type disclosed herein may facilitate the development of highly adaptable, efficient, and environmentally friendly platforms for a myriad of applications, from complex biochemical processing to sustainable single-use diagnostic tools.

Some embodiments of the microchannel fluid storage and delivery systems disclosed herein may include a separate mixing channel designed to enhance sample preparation prior to incubation at specific temperatures. This separate mixing channel may be specifically configured to repeatedly draw up and redeposit the sample within the reaction vessel, thereby generating thorough mixing of the sample. This feature addresses a common challenge in microfluidic systems where achieving uniform sample mixing within confined spaces may be problematic due to laminar flow conditions that typically prevent turbulent mixing.

In a preferred embodiment, the mixing channel is integrally formed with the main microchannel but is distinctly isolated to prevent any premature mixing of reagents. It connects to the reaction vessel through a series of microvalves that control the directional flow of the sample. These microvalves are precision-engineered to allow the sample to be drawn into the mixing channel and then redeposited back into the reaction vessel in a controlled manner. This cyclical process is facilitated by an actuation mechanism, such as a piezoelectric actuator or a micro-pump, which precisely controls the volume and the rate of sample flow through the mixing channel.

In operation, once the sample and necessary reagents are introduced into the reaction vessel, the microvalves open to allow the sample to enter the mixing channel. The actuation mechanism then initiates, creating a dynamic flow that draws the sample up into the channel. Once the sample is (preferably fully) drawn up, the flow direction is reversed, and the sample is effectively redeposited into the reaction vessel. This process may be repeated multiple times to achieve a desired level of homogeneity in the sample mixture.

Preferably, the design of the mixing channel features smooth, rounded contours that promote efficient fluid dynamics, thereby minimizing any dead zones where samples might otherwise stagnate. Additionally, the surface of the mixing channel is treated with a hydrophilic coating to reduce surface tension and improve fluid movement, ensuring complete and effective mixing. The repeated drawing and redepositing of the sample not only enhances mixing but also helps achieve temperature equilibration of the sample before it undergoes further processing steps (such as, for example, PCR amplification or enzymatic reactions) which are temperature-sensitive.

The inclusion of a separate mixing channel offers several advantages. It helps to ensure that the sample and reagents are uniformly mixed, leading to more consistent reaction outcomes. This may be particularly beneficial in biochemical assays where the precision of reagent mixing may significantly influence the reliability of diagnostic results. Furthermore, this system allows for the mixing process to be finely tuned according to the viscosity and volume of the fluid, thereby accommodating a wide range of fluidic properties and sample types without the need for physical agitation.

The mixing channel may be seamlessly integrated into existing microchannel systems with minimal modifications, providing a versatile solution that enhances the functionality of microfluidic devices. The modular nature of this design also allows for easy adaptation and scaling, making it suitable for both small-scale laboratory setups and large-scale automated processes.

Some embodiments of the disclosed microchannel fluid storage and delivery systems disclosed herein may include the integration of advanced sensors. These sensors may be specifically designed to determine the precise placement of reagents within the microfluidic channel by detecting various properties of the fluids. This improvement may significantly increase the accuracy and efficiency of the microfluidic operations by ensuring correct reagent sequencing and placement, which is often critical for the performance of complex biochemical assays.

The sensor integration in this type of embodiment may include an optical sensing device embedded within the microchannel system. This device is preferably equipped with suitable light sources, such as LEDs or laser diodes, and corresponding photodetectors that can detect the color and other optical properties of the fluids passing through the channel. By analyzing the absorbance, fluorescence, or reflectance spectra of the fluids, the optical sensor may be able to accurately identify different reagents based on their unique optical signatures.

For example, when a reagent with a distinct color passes through the microchannel, the optical sensor may detect its presence and correlate the color characteristics with specific reagent types, thereby facilitating precise control over the fluidic operations. This capability may be particularly beneficial for systems where multiple reagents need to be introduced in a specific sequence for assays such as, for example, multi-step chemical reactions or layered sample preparations.

Additionally, the system may include capacitive sensors along the microchannel to further enhance the specificity of fluid identification. These sensors may operate by passing a current through the channel and measuring the resultant electrical properties, such as capacitance, which varies depending on the type of fluid in the channel. By distinguishing between the distinct dielectric constants of air, oil, and aqueous solutions, the capacitive sensor may provide a reliable method to determine the exact nature and placement of each segment within the microchannel.

This capacitive sensing technology may be particularly advantageous for distinguishing between fluids that are visually similar but have different electrical or chemical properties. It is capable of detecting interfaces between different fluid segments, thereby ensuring that no cross-contamination occurs and that the fluidic operations are performed with high precision.

The integration of both optical and capacitive sensors into the microchannel system allows for a dual-modality approach to monitoring and controlling the fluid dynamics within the device. This integration is preferably designed to be seamless, with sensors strategically placed at critical points along the microchannel to provide real-time data on fluid composition and positioning.

The data collected by these sensors not only facilitates immediate adjustments to the fluid handling procedures but also contributes to a database of operational metrics that may be used to refine assay protocols and improve system performance over time. Additionally, the sensors are connected to an automated control system that may interpret sensor data and adjust the operation of microvalves and pumps accordingly, thus automating the process of fluid management within the microfluidic device.

The incorporation of these sophisticated sensing mechanisms into the microchannel fluid storage and delivery system provides several key advantages. It enhances the reliability and accuracy of the microfluidic processes, reduces the risk of human error, and increases throughput by automating the detection and correction of fluid placement errors. Furthermore, the sensor-enhanced system is highly adaptable to a range of fluidic properties and assay requirements, making it a versatile tool for both research and diagnostic applications.

Some embodiments of the microchannel fluid storage and delivery systems disclosed herein may feature the incorporation of oil-soluble dyes into the hydrophobic slugs. This improvement aims to enhance the visual differentiation of hydrophobic slugs within the microfluidic channel and to facilitate more precise optical sensing and monitoring of reagent positions.

The introduction of oil-soluble dyes into the hydrophobic slugs serves multiple functional purposes. Primarily, it aids in the production and quality control processes of the microfluidic devices. By adding distinct colors to the hydrophobic components, manufacturers and technicians can easily verify the correct assembly and functioning of the microfluidic channels during device fabrication. This visual aid ensures that all parts of the system are correctly aligned and that the hydrophobic and aqueous phases are properly segregated as designed. This simple yet effective strategy may reduce production errors and enhance the reliability of each manufactured unit.

Furthermore, the dyed hydrophobic slugs facilitate the use of optical sensing technologies to accurately monitor the position and movement of reagents within the microfluidic system. Optical sensors, integrated along the microchannel, can detect the specific colors associated with each type of hydrophobic slug, thereby identifying their exact locations within the system. This capability is crucial for systems that rely on precise timing and positioning of multiple reagents to initiate chemical reactions or biological assays.

In some applications, the selection of suitable oil-soluble dyes may be critical to the success of this feature. The dyes chosen preferably exhibit strong solubility in the hydrophobic medium to ensure consistent coloration without precipitation or phase separation. Additionally, the dyes are preferably chemically inert within the operational range of the microfluidic system to prevent any interference with the reagents or reactions occurring within the aqueous slugs. Common choices for such dyes may include lipid-soluble dyes such as, for example, Sudan dyes, which are known for their bright colors and stability in non-polar environments.

In some embodiments of the disclosed microchannel fluid storage and delivery system, the selection of suitable oil-soluble dyes may be critical for enhancing the visibility and differentiation of hydrophobic slugs within the microfluidic channels. These dyes are preferably characterized by strong solubility in the hydrophobic medium, consistent coloration without precipitation or phase separation, and chemical inertness within the operational range of the microfluidic system to prevent interference with the reactions or processes occurring within the aqueous slugs. Suitable choices for such dyes include, but are not limited to, various solvent dyes, anthraquinone dyes, azo dyes, phthalocyanine dyes, and perinone and perylene dyes.

For example, solvent dyes such as Nigrosine (solvent black 5), Oil Blue N, and Oil Red O are known for their vivid colors and excellent solubility in non-polar solvents, making them ideal for use in systems where clear visibility of fluid phases is required. Anthraquinone dyes like Disperse Red 60 and Disperse Blue 3 offer stability and solubility in hydrophobic environments, which are advantageous for maintaining clear separation between different fluid segments. Azo dyes, including Solvent Yellow 2 and Solvent Red 24, provide bright coloration and are compatible with various organic solvents, enhancing the functional aesthetics and operational integrity of the microfluidic system. Additionally, phthalocyanine dyes such as Solvent Green 7 and perinone and perylene dyes like Perylene Maroon can be utilized for their robust thermal and chemical stability, which is essential for applications requiring high durability and minimal reactivity within the microfluidic environment.

These dyes, when incorporated into the hydrophobic slugs, assist not only in the visual management of the microfluidic processes but also in the precise control and monitoring of fluid dynamics within the system, ensuring that each reagent is accurately placed and maintained until required for subsequent reactions. This integration of specifically selected dyes into the system architecture allows for enhanced functionality, improved process reliability, and increased operational efficiency.

In practice, the hydrophobic slugs may prepared by mixing the selected oil-soluble dye with the hydrophobic medium at a concentration sufficient to achieve the desired color intensity without compromising the fluid's physical properties. Once prepared, these dyed hydrophobic slugs are introduced into the microfluidic system, where they act as visually distinct markers that facilitate the automated monitoring and control of the fluid handling processes.

The use of colored hydrophobic slugs offers several advantages. For example, technicians can visually monitor the flow and position of hydrophobic slugs during both production and operational phases, enhancing the ease of troubleshooting and system maintenance. Moreover, optical sensors may more reliably detect and differentiate between various slugs within the system, improving the automation and precision of fluid handling. Furthermore, the visual confirmation of slug positioning helps to ensure that the device operates as intended, thus supporting quality assurance protocols.

Some embodiments of the microchannel fluid storage and delivery systems disclosed herein may feature the incorporation of one or more indicators into the slugs. An indicator is a substance that changes color when added to a solution under certain conditions such as, for example, varying by pH (acidity or basicity) or the presence of specific ions or gases.

These indicators may include pH Indicators, which may be utilized to visually signify changes in the hydrogen ion concentration within the microfluidic channels. Each pH indicator possesses a unique range where it changes color, facilitating real-time monitoring and control during the processing of biochemical samples or during chemical reactions. For example, Bromothymol Blue may be incorporated into aqueous slugs to provide visual feedback on the pH level during experimental procedures, ensuring optimal conditions for reactions and analyses.

These indicators may also include redox indicators, which may be important for applications involving oxidation-reduction reactions within the microchannels. These indicators change color in response to changes in the oxidation state of the system, offering a straightforward method to monitor the progress and completeness of redox reactions. Examples of such an indicator include Ferroin, which may change from blue to red, providing a clear and immediate visual cue that can be easily detected by the integrated detection systems of the microchannel apparatus.

These indicators may also include complexometric indicators. These are particularly useful in titrations involving the binding of metal ions within the microfluidic systems. For example, indicators such as Eriochrome Black T may be added to the aqueous slugs to signal the presence and concentration of metal ions like calcium or magnesium by changing color upon binding, aiding in precise quantitative analyses.

These indicators may also include fluorescent indicators, which may be employed for more sophisticated detection methods that involve fluorescence under specific light conditions. These indicators may be particularly useful for automated detection systems integrated within the microfluidic devices, where they enhance the visibility and differentiation of specific biochemical markers or the completion of certain reactions.

The integration of these indicators into the microchannel fluid storage and delivery system not only enhances the functionality and adaptability of the system but also significantly improves the precision and reliability of fluid manipulation and analysis within these sophisticated microfluidic platforms. This capability is crucial for applications requiring high-accuracy fluid handling and processing, such as in diagnostic testing, biochemical analysis, and chemical synthesis.

Some embodiments of the microchannel fluid storage and delivery systems disclosed herein may feature the use of various oil media. Such media are preferably employed to create stable barriers between aqueous slugs, ensuring precise control and separation of reagents. Mineral oil is preferred for its inertness, effectively preventing substance diffusion and providing stability under diverse conditions. Silicone oil, known for its excellent thermal properties and low volatility, may be useful for temperature-sensitive applications, maintaining consistent performance across broad temperature ranges. Fluorinated oils offer robust resistance to chemical interactions, making them suitable for applications demanding minimal contamination and high chemical inertness. For environmentally sustainable options, vegetable oils such as sesame or olive oil may be utilized, offering biocompatibility and biodegradability, beneficial in eco-friendly systems. Additionally, synthetic oils may be customizable to specific viscosity and density needs, optimizing flow dynamics and barrier properties in microfluidic devices. These oils not only prevent mixing between slugs but also enhance the system's functionality by acting as hydraulic fluids, aiding in slug propulsion, and preserving reagent integrity. By selecting a suitable oil medium based on considerations such as, for example, chemical compatibility, temperature stability, and environmental impact, the system may be finely tuned for a range of scientific and industrial processes, ensuring efficient and precise fluid management.

Some embodiments of the disclosed microchannel fluid storage and delivery systems may feature the incorporation of a hydraulic-based system designed to facilitate precise fluid movement. This system may utilize the same type of oil used in the hydrophobic slugs, which separates reagents within the microfluidic channel, to control the propulsion and positioning of fluid slugs with heightened accuracy and reliability.

The hydraulic system may operate by employing the oil not only as a separating medium but also as a driving force for moving other fluids through the microchannel. This dual functionality simplifies the system architecture by reducing the number of materials and components needed, thereby streamlining both the manufacturing process and operational dynamics. The system consists of a series of micro-pumps and valves that are calibrated to utilize the hydraulic properties of the oil to exert controlled pressure on the fluid slugs, propelling them through the microchannel at precise rates.

In operation, the oil may be stored in dedicated reservoirs connected to the micro-pumps. When movement of a particular slug is required, the hydraulic system may activate the pump corresponding to the segment of the channel where the slug is located. The pump injects a controlled amount of oil into the channel, which gently pushes the aqueous or other fluid slugs without mixing, due to the inherent immiscibility of the oil with aqueous solutions. This method ensures that the reagents are transported efficiently to their intended locations within the device, ready for subsequent reactions or analyses.

The use of oil as a hydraulic medium provides several benefits. It ensures that the movement of slugs is smooth and continuous, preventing the jerky motion often associated with air-driven or less viscous liquid-driven systems. The viscosity of the oil provides a natural damping effect, which is advantageous in minimizing the turbulence and shear forces that may disrupt the integrity of delicate biological samples or precise chemical mixtures.

Utilizing the same oil for both separation and propulsion of slugs within the microchannel system offers multiple advantages. For example, since the same oil is used throughout the system, the chemical and physical properties remain consistent, reducing the risk of unexpected interactions or compatibility issues between different materials. Moreover, the need for different fluids for separation and movement is eliminated, simplifying the design and reducing potential points of failure. Furthermore, the hydraulic system may be finely tuned based on the properties of the oil, such as viscosity and density, allowing for more precise control over fluid dynamics and reducing energy consumption.

This hydraulic-based fluid movement system may be integrated into existing microfluidic platforms with minimal modifications. It is particularly suitable for systems requiring high precision and gentle handling of reagents, such as in the fields of diagnostics, drug development, and biological research. The modular nature of the design also allows for scalability and adaptation to different sizes and complexities of microfluidic devices.

Some embodiments of the microchannel fluid storage and delivery systems disclosed herein incorporate variable volumes of hydrophobic slugs to strategically place reagents within the microfluidic channel. This method is designed to prevent the inadvertent heating of agents prior to their incorporation into reactions, thereby maintaining the integrity and effectiveness of the reagents.

In such embodiments, the system preferably utilizes a sophisticated control mechanism that adjusts the volume of hydrophobic slugs inserted between aqueous slugs containing reagents. By varying the volume of these hydrophobic slugs, the system may control the spatial separation between reagents within the microchannel. This control allows for precise timing of reagent mixing and reaction initiation, which may be important for reactions that are sensitive to temperature or require specific activation conditions.

A significant benefit of this approach is the minimization of the total volume of hydrophobic material used in the system. By strategically adjusting the volume of hydrophobic slugs, it is possible to reduce the overall amount of hydrophobic medium required, which not only conserves material but also reduces the potential for waste. This may be particularly advantageous in applications where the hydrophobic medium is expensive or where minimizing chemical waste is a priority.

The strategic reagent placement afforded by this embodiment offers several advantages. For example, by increasing the distance between heat-sensitive reagents and sources of heat (such as reaction zones or external heaters), the variable hydrophobic slugs help maintain the reagents at their optimal temperatures until they are needed for the reaction. Moreover, the precise placement of reagents allows for better control over reaction timing and conditions, ensuring that all reagents are introduced into the reaction environment in the most effective manner. Finally, by optimizing the volume of hydrophobic slugs, the system uses only as much hydrophobic material as necessary, reducing costs associated with material purchase and disposal.

The system is preferably equipped with programmable pumps and valves that precisely control the injection of hydrophobic and aqueous slugs into the microchannel. Software algorithms calculate the required volumes based on the reagent types, their interaction properties, and the desired separation distances. Feedback sensors positioned along the microchannel provide real-time data on the position and volume of each slug, allowing the system to adjust the slug volumes dynamically to achieve optimal reagent placement.

This innovative approach to reagent placement may be seamlessly integrated into existing microfluidic systems used in biochemical analysis, synthetic biology, and pharmaceutical development. The adaptability of the control software allows for easy customization to accommodate a wide range of reagent types and reaction conditions, making it a versatile solution for advanced microfluidic applications.

Some embodiments may feature the introduction of parallel pipelines in the disclosed microchannel fluid storage and delivery systems. These pipelines are designed to contain single reagents or a series of reagents that are intended to be added at the same step in a reaction sequence. The pipelines are segmented by oil slugs to ensure discrete handling and addition of these reagents, enhancing the system's capability to perform complex, multi-step biochemical reactions more efficiently.

Each pipeline within the system may be dedicated to a specific reagent or a predefined series of reagents. This configuration allows for the simultaneous but independent handling of multiple reagents, which may be added to the reaction chamber in a controlled and sequential manner. The pipelines are preferably arranged parallel to each other within the microfluidic device, with each channel capable of being individually controlled by microvalves and pumps that dictate the flow and timing of reagent release.

The strategic insertion of oil slugs between each segment of reagent within the pipelines serves multiple purposes. For example, oil slugs act as barriers that prevent the premature mixing of reagents within the pipelines, maintaining their integrity until the point of intended mixing. Moreover, by manipulating the volume and movement of the oil slugs, the system can precisely control when and how much of each reagent is introduced into the reaction chamber. Furthermore, oil slugs minimize the risk of cross-contamination between sequential additions of different reagents, crucial for maintaining the accuracy of reactions.

The parallel pipelines allow for the iterative addition of reagents to the reaction chamber. This is particularly useful in complex synthetic processes where the timing and order of reagent addition may significantly influence the yield and purity of the final product. For instance, in a multi-step organic synthesis, different catalysts or reactants may be added at specific stages without the need for manual intervention, thereby streamlining the entire process.

The foregoing design helps to ensure operational efficiency by allowing multiple reactions or assays to be conducted simultaneously within the same device. Each pipeline may be independently loaded and operated, increasing throughput and reducing the time required for experimental setups and execution. The automated control system coordinates the operation of all pipelines, ensuring that each reagent is added at the correct time and in the correct sequence.

The modular nature of the parallel pipelines allows for easy integration into a wide range of existing microfluidic systems and may be scaled up to handle larger volumes or additional types of reagents as needed. This scalability makes it an ideal solution for both high-throughput industrial applications and precise laboratory research where flexibility in reaction design is often essential.

Various reagents may be utilized in the microchannel fluid storage and delivery systems disclosed herein, with the particular choice of reagents typically being driven by the specific needs of diverse biochemical and chemical applications. These reagents include various enzymes, buffers, substrates, co-factors, probes, dyes, indicators, nucleic acids, and chemical reactants.

For example, various enzymes may be utilized in the microchannel fluid storage and delivery systems disclosed herein, especially in biochemical applications and processes. Such enzymes may include, for example, DNA polymerases, proteases, and lipases, which may be used in diagnostic assays, molecular biology experiments, and synthetic biology applications. The precise delivery and storage of enzyme-containing aqueous slugs within the microchannels allow for controlled initiation of reactions at optimal times and conditions.

Various buffers may be utilized in the microchannel fluid storage and delivery systems disclosed herein. These are often essential for maintaining the pH of a solution at a constant value, which may be critical for the stability and activity of biological molecules. Buffers such as Tris, phosphate, and acetate may be stored in discrete slugs to ensure that the microenvironment within the microchannel system is conducive for the intended biochemical reactions.

Various substrates and co-factors may be utilized in the microchannel fluid storage and delivery systems disclosed herein. Substrates necessary for enzymatic reactions or co-factors required for enzyme activity, such as ATP or NADH, may be integral to facilitating various biochemical transformations. Their precise introduction into the reaction milieu via the microfluidic system helps to ensure efficient and controlled biochemical processes.

Various probes and dyes may be utilized in the microchannel fluid storage and delivery systems disclosed herein. For example, fluorescent probes or colorimetric dyes may be used to detect specific molecules or monitor the progress of reactions. These reagents may be particularly useful for real-time monitoring and can be integrated into the system's automated detection mechanisms to provide immediate analytical feedback.

Various nucleic acids may be utilized in the microchannel fluid storage and delivery systems disclosed herein. DNA and RNA samples, which may be manipulated or analyzed for genetic testing, sequencing, or synthesis applications, are examples of reagents that require precise handling to avoid degradation and contamination. The microchannel system facilitates the controlled transport and mixing of these sensitive reagents under optimal conditions.

Various chemical reagents may be utilized in the microchannel fluid storage and delivery systems disclosed herein, especially those which are used in synthetic chemistry applications. These may include organic compounds, inorganic salts, and solvents that need to be introduced in a controlled manner to ensure reaction specificity and yield.

The ability to handle these diverse types of reagents with high precision and accuracy underscores the utility of the microchannel fluid storage and delivery system in a wide range of scientific and industrial applications. This system not only provides a robust platform for conducting sophisticated biochemical and chemical processes but also significantly improves the reproducibility and efficiency of experiments and manufacturing processes.

Various detection mechanisms may be integrated into the microchannel fluid storage and delivery systems disclosed herein. Preferably, these detection mechanisms are disposed throughout the microchannels to enable accurate, real-time monitoring and control of fluid dynamics. These mechanisms may include optical detection systems, capacitive sensors, conductivity sensors, pH sensors, thermal sensors, and pressure sensors, each of which may contribute to precise fluid handling and ensuring the reliable operation of the microfluidic network.

Optical detection systems, equipped with cameras, photodetectors, and light sources (such as LEDs or lasers), may be utilized to assess changes in color, transparency, or fluorescence to detect chemical reactions or the presence of particular substances. These capabilities may be vital for continuous observation of reaction kinetics or for detecting specific biomarkers within the system. Capacitive sensors, which may be strategically positioned along the microchannels, may be utilized to measure variations in dielectric properties, which may be helpful in effectively distinguishing between disparate fluids (e.g., oil and aqueous media) and pinpointing slug interfaces to avert cross-contamination or inadvertent mixing.

Conductivity sensors may be utilized to measure the ionic content in aqueous slugs to determine fluid conductivity, which may be essential for processes that depend on defined electrolyte concentrations or buffer conditions. In parallel, pH sensors may be integrated directly into the microchannel environment to provide immediate readings of fluid acidity or alkalinity, which may be critical for pH-sensitive reactions common in biochemical assays and certain chemical syntheses. Thermal sensors may be utilized to monitor and regulate temperature within the microchannels, which may be an indispensable function for procedures involving heat-sensitive enzymes, polymerase chain reactions (PCR), or other temperature-dependent operations. Lastly, pressure sensors may be utilized to track fluid pressure across the system, revealing blockages or leaks that could compromise fluid flow and the overall integrity of the microfluidic platform.

By delivering real-time data and enabling interactive control, these detection systems may collectively enhance the versatility, accuracy, and consistency of fluid handling within the microchannel system. Their integration helps to ensure that a wide range of analytical, diagnostic, and synthetic processes can be performed under tightly controlled conditions, thus improving both the robustness and efficiency of the devices and methodologies described herein.

In some embodiments, the sequence of discrete slugs may be introduced into the microchannel using a syringe pump. A syringe pump typically includes a motor-driven mechanism that advances a plunger within a cylindrical syringe, precisely controlling the volume and flow rate of the fluid being dispensed. This level of control is often crucial for maintaining consistent slug sizes, as well as for timing the introduction of reagents in applications requiring multiple fluids. Moreover, syringe pumps may be programmed to dispense fluids at very low flow rates, making them suitable for sensitive processes where even slight variations in fluid delivery may affect the outcome of a reaction or analysis.

Alternatively, peristaltic pumps may be employed for introducing the discrete slugs. A peristaltic pump operates by compressing a flexible tube in a sequential rolling motion, effectively pushing the fluid forward without exposing it to moving mechanical components. This feature may be especially beneficial for sterile or reactive samples, as there is minimal risk of contamination. Additionally, peristaltic pumps can be adapted to process fluids of varying viscosities. The inherent pulsatile flow from peristaltic mechanisms can be harnessed to facilitate the formation of discrete slugs, provided the flow rate and tubing dimensions are appropriately selected.

In other embodiments, a gravity-driven flow system may be used to introduce discrete slugs into the microchannel. By elevating a reservoir containing the fluid above the inlet of the microchannel, fluid is allowed to flow downward under the influence of gravity. Slug formation may be achieved by incorporating air gaps or hydrophobic segments at specific intervals as the fluid descends. While this approach offers simplicity and requires minimal specialized equipment, it may be more susceptible to variations in flow rate caused by changes in fluid level and external conditions. Consequently, gravity-driven systems may be advantageous for applications where simplicity and low cost are prioritized over the highly precise flow control typically provided by syringe or peristaltic pumps.

In some embodiments of the microchannel fluid storage and delivery systems disclosed herein, the microchannel may be designed to include multiple segmented sections, each of which may be heated or cooled independently. This setup enables temperature control tailored to the needs of specific fluid slugs as they travel through distinct zones of the microchannel. By dividing the microchannel into multiple thermal segments, the system may accommodate complex, multi-step reactions or sample processing protocols that require different temperature conditions for each step.

For example, in biochemical applications involving thermally sensitive enzymes, a slug containing a reagent may first enter a heated section of the microchannel where an enzymatic reaction is initiated at the optimal temperature. Once that reaction is complete, the slug may be driven forward to a subsequent segment maintained at a lower temperature, thus halting or slowing the enzymatic process. Similarly, if a PCR (polymerase chain reaction) process is to be performed, the microchannel may include separate zones set to denaturation, annealing, and extension temperatures, enabling continuous, flow-through thermal cycling without the need for traditional bulk heating or cooling equipment.

Each thermally controlled segment may include integrated temperature sensors such as, for example, thermocouples or resistance temperature detectors (RTDs), which provide real-time feedback to a centralized or distributed control system. This feedback loop enables precise temperature adjustments and ensures consistent conditions for each slug as it passes through the device. In some embodiments, these segments may be separated by thermally insulating structures or materials that limit heat transfer between adjacent zones, thereby helping to maintain tight temperature gradients and preventing undesired heating or cooling of neighboring sections.

By fine-tuning the temperature profile along the microchannel, the device may execute complex reaction schemes in a continuous flow format, reducing the need for extensive manual handling or multiple pieces of equipment. This approach not only increases efficiency but also improves reproducibility, as each slug experiences the same thermal conditions in a predictable and controlled manner. Consequently, segmented temperature control may be particularly advantageous for applications that demand multi-stage or temperature-dependent processes, such as DNA amplification, enzyme-driven reactions, or temperature-sensitive chemical syntheses.

As previously indicated, in some embodiments, the microchannel fluid storage and delivery system may employ external magnetic fields to control the positioning and movement of fluid slugs that have been doped or seeded with magnetic particles. This approach leverages the innate responsiveness of magnetically tagged slugs to external magnetic fields, facilitating a variety of sophisticated operations within the microchannel, such as aligning, concentrating, or even merging distinct slugs on-demand.

In practice, these magnetic particles may comprise ferromagnetic or paramagnetic materials, typically on a microscale or nanoscale level, to ensure uniform dispersion within the fluid slug without significantly altering the fluid's rheological properties. When one or more of the slugs contain these particles, the application of a localized magnetic field at specific points along the microchannel causes those slugs to move or align according to the field gradient. This controlled motion can be exploited in multiple ways. For example, magnetic focusing may be utilized to guide the slug toward a targeted reaction zone or to bring it into proximity with another slug for mixing or reaction. Similarly, in applications that require the isolation or collection of certain materials (for example, cells labeled with magnetic beads), slugs containing magnetically sensitive particles can be guided into designated capture areas where they can be separated from non-magnetic components.

A key advantage of this approach is the precision offered by magnetic field manipulation. By varying the field strength, orientation, or profile, the system can selectively maneuver specific slugs without disturbing neighboring fluid segments. This selective actuation enables complex multi-step processes to occur in a relatively small footprint, eliminating the need for additional mechanical valves or pumps. Furthermore, since the microchannel system may already be sealed or semi-sealed, introducing a magnetic field from outside the device preserves its integrity and prevents potential contamination, making this technique particularly useful for sensitive biological or chemical applications.

In some embodiments of the microchannel fluid storage and delivery system disclosed herein, the interior surfaces of the microchannels may be treated with a non-stick coating to reduce or eliminate adhesion of fluid slugs to the channel walls. This approach maintains the shape and separation of discrete slugs, thereby preventing residue buildup or partial mixing that could compromise the integrity of the fluids. Some possible non-stick coatings that may be utilized for this purpose include polytetrafluoroethylene (PTFE), fluoropolymers, silicones, and other specialized chemical treatments designed to yield hydrophobic or oleophobic surfaces.

By minimizing friction and interfacial tension between the fluid slugs and the channel walls, the non-stick coating helps to preserve clear boundaries between adjacent slugs, even under conditions of rapid flow rate changes, agitation, or prolonged storage. This characteristic may be especially important in applications requiring precise volumetric control or strict isolation of sensitive reagents. Additionally, the enhanced surface properties may facilitate simpler cleaning and sterilization, ensuring reusability and extending the device's operational lifespan. Thus, implementing non-stick coatings not only supports accurate fluid handling but also reduces cross-contamination risks, contributing to the reliability and robustness of the microfluidic system.

In some embodiments of the microchannel fluid storage and delivery system disclosed herein, the system may incorporate a comprehensive, integrated control system that automates some or all operational aspects of the system. The control system may include a microcontroller or similar processor in communication with a suite of sensors and actuators, accompanied by dedicated software that executes a predefined or dynamically adjustable set of instructions. This software-based control allows for meticulous management of fluid flow parameters, enabling precise timing and volume of slug introduction. By controlling the rate at which pumps, valves, or other flow-regulating components operate, the system may introduce discrete slugs at designated intervals or under specific conditions. This ability may be critical for multi-step reactions requiring carefully orchestrated reagent additions.

Beyond merely dispensing slugs, the integrated control system may also synchronize the activation of reaction chambers, heating or cooling zones, and in-line sensors or detectors located throughout the microchannel network. For example, when a slug of reactant is introduced into a heated segment, the software may concurrently trigger the chamber's heating element, ensuring that the slug is maintained at an optimal reaction temperature. At the same time, the system may monitor sensor outputs (such as, for example, optical, pH, or conductivity data) to track reaction progress in real time. If needed, the microcontroller may adjust operational parameters on the fly, such as altering temperature or introducing additional reagents, based on feedback received from these sensors.

This level of automation may not only increase throughput by minimizing manual intervention but may also improve reproducibility and accuracy. In research or industrial settings where stringent quality control is required, the software may record each operational event (for example, slug dispensed, temperature achieved, sensor readings over time), thereby forming a comprehensive data log. Such detailed logging supports traceability, aids in troubleshooting, and enables more robust process optimization. Furthermore, the modular nature of the software allows end users to tailor routines for different applications, whether they involve rapid diagnostic assays, multi-stage chemical syntheses, or complex biochemical transformations requiring a sequence of precisely timed steps.

The above description of the present invention is illustrative and is not intended to be limiting. It will thus be appreciated that various additions, substitutions and modifications may be made to the above described embodiments without departing from the scope of the present invention.

What is claimed is:

1. A method for preventing mixing between adjacent slugs within a microchannel fluid storage and delivery system, the method comprising:

introducing a sequence of discrete slugs into a microchannel in said microchannel fluid storage and delivery system, wherein said sequence includes at least one aqueous slug and at least one hydrophobic slug which are adjacent to each other; and disposing an air slug between said at least one aqueous slug and said at least one hydrophobic slug.

2. The method of claim 1, wherein said at least one aqueous slug contains at least one reagent.

3. The method of claim 2, wherein the at least one reagent contained within said at least one aqueous slug is selected from the group consisting of DNA samples, enzymes, buffer solutions, and indicators.

4. The method of claim 1, wherein said at least one hydrophobic slug comprises an oil medium having at least one hydrophobic substance disposed therein.

5. The method of claim 4, wherein the oil medium comprises at least one hydrophobic substance selected from the group consisting of mineral oil, silicone oil, and fluorinated oil.

6. The method of claim 5, wherein said at least one hydrophobic substance in the oil medium includes additives to enhance optical clarity of the oil medium, thereby facilitating visual monitoring of slug boundaries.

7. The method of claim 1, wherein disposing said air slug creates a physical barrier that is impermeable to both said at least one aqueous slug and said at least one hydrophobic slug, thereby enhancing the stability of said at least one aqueous slug and said at least one hydrophobic slug against physical disturbances.

8. The method of claim 1, further comprising the step of controlling a temperature within said microchannel to manipulate a viscosity of said at least one hydrophobic slug, thereby facilitating a controlled recombination of adjacent slugs.

9. The method of claim 8, further comprising adjusting the temperature based on real-time viscosity measurements obtained from sensors within the microchannel.

10. The method of claim 1, wherein said microchannel fluid storage and delivery system is fabricated from materials selected from the group consisting of polydimethylsiloxane (PDMS), glass, and polymethyl methacrylate (PMMA).

11. The method of claim 10, further including a coating of the microchannel with a non-stick material to prevent adhesion of the sequence of discrete slugs to the channel walls, thereby maintaining the integrity of the slug separation.

12. The method of claim 1, further comprising employing an integrated detection system within the microchannel for real-time monitoring of slug integrity, sequence, and potential mixing.

13. The method of claim 1, wherein the sequence of discrete slugs is introduced into the microchannel using a mechanism selected from the group consisting of injection via syringe pumps, injection via peristaltic pumps, and injection via gravity-driven flow.

14. The method of claim 13, wherein the syringe pumps are equipped with programmable controls to adjust the speed and volume of slug injection based on pre-set experimental protocols.

15. The method of claim 1, wherein the at least one aqueous slug further includes a fluorescent marker configured to be detected by an integrated optical monitoring system within said microchannel, the fluorescent marker serving as a signal for verifying slug placement and integrity as part of a multi-modal detection architecture that also incorporates additional sensing modalities to confirm sequence and composition.

16. The method of claim 1, wherein the microchannel is equipped with capacitive sensors distributed along its length, the capacitive sensors being configured to detect dielectric properties of individual slugs so as to distinguish aqueous, hydrophobic, and gaseous segments, wherein said microchannel fluid storage and delivery system includes a detection system, and wherein said detection system comprises an optical and fluorescent monitoring system and a controller operatively coupled to the capacitive sensors and the optical and fluorescent monitoring system, the controller being configured to integrate capacitive sensor data with optical and fluorescent monitoring data to form a multi-modal detection architecture that provides continuous verification of slug identity and order.

17. The method of claim 16, wherein the detection system further comprises ultrasonic sensors configured to interrogate the density and composition of the at least one aqueous slug and the at least one hydrophobic slug in real time and generate ultrasonic data therefrom, the ultrasonic data being combined with capacitive and optical data to reinforce accuracy and redundancy within the multi-modal detection architecture, thereby ensuring both spatial and compositional fidelity of the slug sequence.

18. The method of claim 1, wherein the sequence of discrete slugs includes a plurality of air slugs, and wherein each of the plurality of air slugs is introduced at intervals calculated to optimize the thermal isolation between the at least one aqueous slug and the at least one hydrophobic slug, thereby preserving the reactivity of temperature-sensitive reagents.

19. The method of claim 1, wherein the sequence of discrete slugs contains magnetic particles and is aligned within the microchannel by an externally applied magnetic field, the magnetic alignment serving as a control modality that operates in coordination with the multi-modal detection architecture, such that the integration of optical, capacitive, ultrasonic, and magnetic domains provides a comprehensive system for monitoring and actively manipulating slugs during storage, handling, and deliver.

20. The method of claim 1, wherein the microchannel includes segmented sections, wherein each of said segmented sections is capable of being individually heated or cooled, to allow for sequential treatment of the sequence of discrete slugs as the sequence of discrete slugs pass through different zones of the microchannel.

* * * * *